US010997530B2

(12) United States Patent
Bollapragada et al.

(10) Patent No.: US 10,997,530 B2
(45) Date of Patent: *May 4, 2021

(54) SYSTEMS AND METHODS FOR MULTI-RESOURCE SCHEDULING

(71) Applicant: General Electric Company, Schenectady, NY (US)

(72) Inventors: Srinivas Bollapragada, Schenectady, NY (US); Christopher Donald Johnson, Clifton Park, NY (US); Bex Thomas, Ballston Lake, NY (US); Dianne Chace, Charlotte, VT (US)

(73) Assignee: General Electric Company, Schenectady, NY (US)

( * ) Notice: Subject to any disclaimer, the term of this patent is extended or adjusted under 35 U.S.C. 154(b) by 853 days.

This patent is subject to a terminal disclaimer.

(21) Appl. No.: 15/637,677

(22) Filed: Jun. 29, 2017

(65) Prior Publication Data

US 2017/0308823 A1    Oct. 26, 2017

Related U.S. Application Data

(63) Continuation of application No. 12/822,510, filed on Jun. 24, 2010, now Pat. No. 9,727,829.

(Continued)

(51) Int. Cl.
*G06Q 10/06* (2012.01)
*G06Q 10/04* (2012.01)

(52) U.S. Cl.
CPC ....... *G06Q 10/043* (2013.01); *G06Q 10/0631* (2013.01)

(58) Field of Classification Search
CPC .... G06Q 10/00; G06Q 30/02; G06Q 10/0631; G06F 19/32; G06F 19/325; G06F 9/4806;
(Continued)

(56) References Cited

U.S. PATENT DOCUMENTS 6,578,005 B1 *  6/2003  Lesaint ................. G06Q 10/06
                                                    705/7.14
7,516,455 B2 *  4/2009  Matheson .............. G06Q 10/06
                                                    718/102

(Continued)

OTHER PUBLICATIONS

Baumgart et al., Using Computer Simulation is Operating Room Management: Impacts on Process Engineering and Performance, Apr. 28, 2007, 2007 40th Annual Hawaii International Conference of System Sciences, IEEE Explore, pp. 1-10 (Year: 2007).*

(Continued)

*Primary Examiner* — Robert D Rines
(74) *Attorney, Agent, or Firm* — Hanley, Fight and Zimmerman, LLC

(57) ABSTRACT

Systems and methods for multi-resource scheduling are disclosed and described. An example apparatus includes a scheduler engine configured to enable clinical system(s) to operate with the scheduler engine in an analytical mode and an operating mode. When in the analytical mode, the scheduler engine is to dynamically calculate one or more binding constraints on the one or more clinical systems for scheduling. When in the operating mode, the scheduler engine is to manage and output a schedule for the one or more clinical systems based on the one or more binding constraints calculated in the analytical mode. The example scheduler engine is to dynamically switch between the analytical mode and the operating mode based at least in part on a probabilistic determination of delay associated with the schedule.

20 Claims, 10 Drawing Sheets

Related U.S. Application Data

(60) Provisional application No. 61/264,551, filed on Nov. 25, 2009.

(58) Field of Classification Search
CPC .... G06F 9/4881; G06F 9/4843; G06F 9/4887; G06F 1/329; G16H 40/20
USPC .................................... 705/7.11–7.42, 2, 3
See application file for complete search history.

(56) References Cited

U.S. PATENT DOCUMENTS

| | | | |
|---|---|---|---|
| 8,046,239 B2* | 10/2011 | Wendl ................ | G06Q 10/0631 705/2 |
| 2002/0165733 A1* | 11/2002 | Pulkkinen ............. | G06F 19/321 705/2 |
| 2002/0183979 A1* | 12/2002 | Wildman ................. | G07C 1/10 702/188 |
| 2003/0227386 A1* | 12/2003 | Pulkkinen ............. | A61B 5/1113 340/573.1 |
| 2004/0249676 A1* | 12/2004 | Marshall ................ | G06Q 10/10 705/2 |
| 2006/0109843 A1* | 5/2006 | Assheuer ............. | G06Q 10/107 370/379 |
| 2007/0136118 A1* | 6/2007 | Gerlach ........... | G06Q 10/06312 705/7.21 |
| 2007/0255592 A1* | 11/2007 | Green ................. | G06Q 10/109 705/2 |
| 2008/0312959 A1* | 12/2008 | Rose ..................... | G16H 50/20 705/2 |
| 2009/0119126 A1 | 5/2009 | Johnson et al. | |
| 2009/0122618 A1 | 5/2009 | Shields et al. | |
| 2011/0125539 A1 | 5/2011 | Bollapragada et al. | |

OTHER PUBLICATIONS

United States Patent and Trademark Office, "Notice of Allowance and Fee(s) Due", issued in connection with U.S. Appl. No. 12/822,510, dated Mar. 30, 2017, 34 pages.

United States Patent and Trademark Office, "Advisory Action", issued in connection with U.S. Appl. No. 12/822,510, dated Dec. 27, 2016, 4 pages.

United States Patent and Trademark Office, "Final Office action", issued in connection with U.S. Appl. No. 12/822,510, dated Oct. 20, 2016, 20 pages.

United States Patent and Trademark Office, "Non-Final Office action", issued in connection with U.S. Appl. No. 12/822,510, dated Apr. 8, 2016, 33 pages.

United States Patent and Trademark Office, "Advisory Action", issued in connection with U.S. Appl. No. 12/822,510, dated Dec. 10, 2015, 4 pages.

United States Patent and Trademark Office, "Final Office action", issued in connection with U.S. Appl. No. 12/822,510, dated Aug. 3, 2015, 26 pages.

United States Patent and Trademark Office, "Non-Final Office action", issued in connection with U.S. Appl. No. 12/822,510, dated Jan. 5, 2015, 20 pages.

United States Patent and Trademark Office, "Non-Final Office action", issued in connection with U.S. Appl. No. 12/822,510, dated Jun. 5, 2014, 20 pages.

United States Patent and Trademark Office, "Final Office action", issued in connection with U.S. Appl. No. 12/822,510, dated Oct. 29, 2012, 16 pages.

United States Patent and Trademark Office, "Non-Final Office action", issued in connection with U.S. Appl. No. 12/822,510, dated Apr. 3, 2012, 13 pages.

* cited by examiner

SYSTEMS AND METHODS FOR MULTI-RESOURCE SCHEDULING

CROSS-REFERENCE TO RELATED APPLICATIONS

This patent arises from a continuation of U.S. Non-Provisional patent application Ser. No. 12/822,510, filed on Jun. 24, 2010, entitled "SYSTEMS AND METHODS FOR MULTI-RESOURCE SCHEDULING", which claims the benefit of U.S. Provisional Patent Application No. 61/264,551, filed on Nov. 25, 2009, entitled "SYSTEMS AND METHODS FOR MULTI-RESOURCE SCHEDULING", both of U.S. Non-Provisional patent application Ser. No. 12/822,510 and U.S. Provisional Patent Application No. 61/264,551 are hereby incorporated by reference herein in their entirety.

FEDERALLY SPONSORED RESEARCH OR DEVELOPMENT

[Not Applicable]

MICROFICHE/COPYRIGHT REFERENCE

[Not Applicable]

BACKGROUND

The invention relates generally to process management systems, and more particularly to scheduling systems in the clinical setting, such as healthcare delivery institutions or hospitals.

Healthcare delivery institutions are business systems that can be designed and operated to achieve their stated missions robustly. As is the case with other business systems such as those designed to provide services and manufactured goods, there are benefits to managing variation such that the stake-holders within these business systems can focus more fully on the value added core processes that achieve the stated mission and less on activity responding to variations such as emergency procedures, regular medical interventions, delays, accelerations, backups, underutilized assets, unplanned overtime by staff and stock outs of material, equipment, people and space that are impacted in the course of delivering healthcare.

Currently clinical process decisions have historically relied on the art of understanding symptoms and diagnosing causality much in alignment with the practice of the medical diagnosis arts. In an ever-evolving environment, judgment and experientially-developed mental models are utilized by the healthcare providers to utilize the information currently at hand to make decisions. Presented with similar data, the decision made from one caregiver to another typically exhibits a variation. Presented with partial information, which is the byproduct of being organized in functional departments, specialties, roles and by the nature of having partial and/or current or dated information availability on hand—clinical process decisions vary widely and typically are locally focused for lack of a systems view upstream and downstream of the decision point.

As a hospital processes care plans on an increasing patient load, these variations in medical condition and selected treatment plans perturbs the schedules of doctors, nurses and assets such as rooms and equipment. If there is protective capacity in these schedules and staff, the providers of care can manage variation while maintaining care quality. When randomness and interdependencies exceed the ability to serve, care providers are forced to make choices amongst poor alternative options; someone or something is going to be bottlenecked or overextended. Delays, queues, overtime, burnout and emotional decision making characterize systems that are over-taxed or beyond their ability to perform.

Where information systems exist, they are simply informational in nature. Examples include scheduled rooms, people, materials and equipment. Recent advances in locating devices such as those utilizing radio-frequency identification (RFID) technology to report a location of a tagged asset are utilized, yet personnel are loath to be tracked by wearing a device. RFID devices are not pervasive, and the systems that monitor them are not fully integrated with the requisite adjacent systems that gather contextual information. The current art is not predictive, probabilistic nor necessarily systemic. For example, knowing the location of an asset is desirable but knowing its anticipated need and interdependencies is required to make a decision to use a located asset actionable. The information required for such a decision comes from a plurality of adjacent health information systems and must have an ability to play forward into the future.

Today, current procedure duration and room status is provided without any proactive or forward-looking capability. Schedules are produced before a day's activities commence. Process status is displayed along with trending and, often, alarm functionality should a process variable trip a threshold set point. Today, processes are planned for a given volume; when that volume is exceeded or processes have sufficient variation to overtax their capability, scheduling and recovery are reduced to manual triage and experience to sort out. Typically, queues, delay, overtime and cancellation result; there is no proactive decision support to dynamically reschedule people or physical assets or supplies.

Radiology Information Systems (RIS) and other clinical information systems are in wide use in the healthcare industry to manage radiology departments in hospitals and independent radiology clinics. These systems typically incorporate functionality to schedule patients on radiology equipment such as computed tomography (CT) and magnetic resonance imaging (MRI) machines. However, radiology exams also require a numbers of other resources such as technicians, nurses, radiologists, anesthesiologists and other equipment such as portable ultra sound and X-ray machines. In general, these resources are not scheduled and are assumed to be available during the times when the exams are scheduled. However, this is not always true and leads to delays in completing the scheduled exams.

BRIEF SUMMARY

Certain examples systems and methods for multi-resource scheduling to schedule resources involved in an exam. Certain examples enable both automatic and manual scheduling and/or rescheduling of inpatient and outpatient appointments.

Certain examples provide a multi-resource scheduler system for a clinical enterprise. The system includes a processor connected to a memory, wherein the processor is programmed to implement the system. A scheduler engine is to generate a schedule for a clinical facility involving multiple tasks and using multiple resources. The scheduler engine is to identify a slot for a task defined by a scheduled task duration and one or more resources. The task includes a plurality of sub-tasks, and each sub-task has a sub-task duration utilizing one or more of the one or more resources.

Each sub-task is to be performed consecutively based on resource constraints. The scheduler engine is to identify and select a time slot for the task based on resource availability, the plurality of sub-tasks in the task, and a duration associated with each sub-task. Resource availability information is obtained from a clinical information system. Each resource is scheduled only for one or more sub-tasks in which the resource is involved. A scheduler interface is to display and facilitate access to the schedule including the task and the plurality of sub-tasks.

Certain examples provide a tangible computer-readable storage medium including a set of instructions for execution on a computer. The set of instructions, when executed, implementing a multi-resource clinical scheduler. The scheduler includes a scheduler engine to generate a schedule for a clinical facility involving multiple tasks and using multiple resources. The scheduler engine is to identify a slot for a task defined by a scheduled task duration and one or more resources. The task includes a plurality of sub-tasks. Each sub-task has a sub-task duration utilizing one or more of the one or more resources. Each sub-task is to be performed consecutively based on resource constraints. The scheduler engine is to identify and select a time slot for the task based on resource availability, the plurality of sub-tasks in the task, and a duration associated with each sub-task. Resource availability information is obtained from a clinical information system. Each resource is scheduled only for one or more sub-tasks in which the resource is involved. The system includes a scheduler interface to display and facilitate access to the schedule including the task and the plurality of sub-tasks.

Certain examples provide a computer-implemented method for scheduling of clinical tasks involving multiple sub-tasks and multiple resources in a clinical enterprise. The method includes identifying a slot for a task defined by a task duration and one or more resources, the task including a plurality of sub-tasks, each sub-task having a sub-task duration utilizing one or more of the one or more resources, wherein each sub-task to be performed consecutively based on resource constraints; selecting a time slot for the task based on resource availability, the plurality of sub-tasks in the task, and a duration associated with each sub-task, wherein resource availability information is obtained from a clinical information system, and wherein each resource is scheduled only for one or more sub-tasks in which the resource is involved; displaying the schedule including the task and the plurality of sub-tasks; and facilitating access to view and modify the schedule.

BRIEF DESCRIPTION OF SEVERAL VIEWS OF THE DRAWINGS

FIG. 4 shows example clinical tasks and resources within a scheduled duration.

FIG. 5 illustrates an example of resource constraint and routing.

Figure 1:
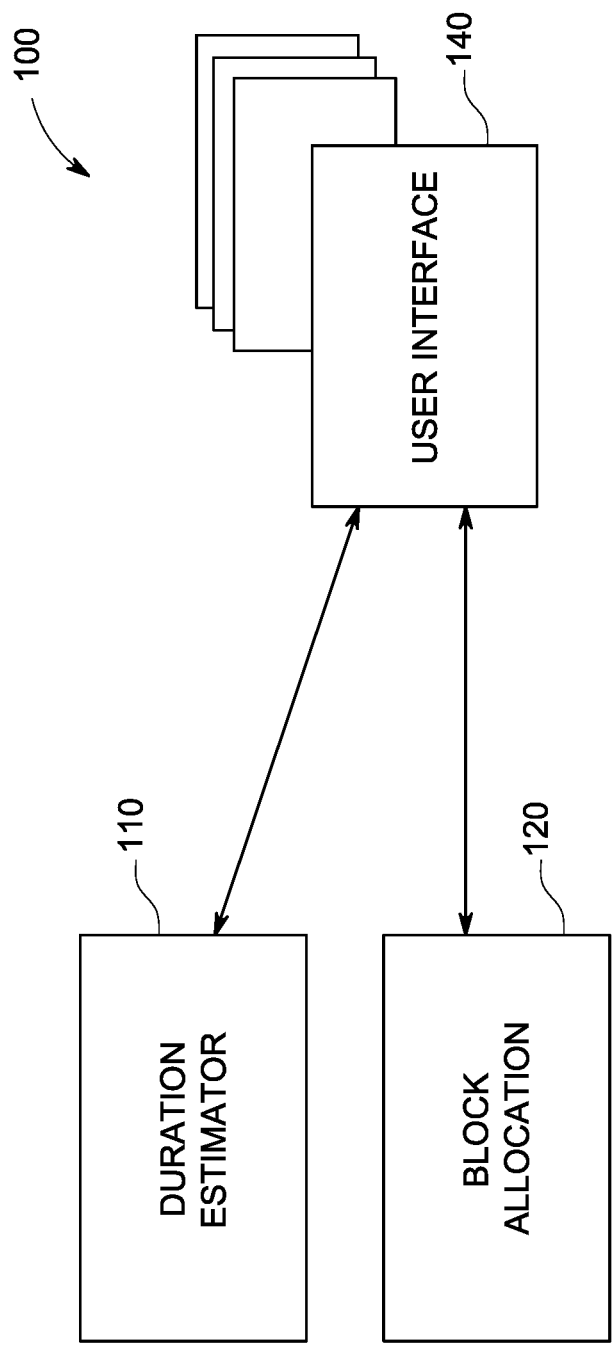
FIG. 1 is a block diagram illustration of an example system to plan clinical procedures.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EXAMPLES

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

Radiology Information Systems (RIS) and other clinical information systems are in wide use in the healthcare industry to manage radiology departments in hospitals and independent radiology clinics. These systems typically incorporate functionality to schedule patients on radiology equipment such as computed tomography (CT) and magnetic resonance imaging (MRI) machines. However, radiology exams also require a numbers of other resources such as technicians, nurses, radiologists, anesthesiologists and other equipment such as portable ultra sound and X-ray machines. In general, these resources are not scheduled and are assumed to be available during the times when the exams are scheduled. However, this is not always true and leads to delays in completing the scheduled exams. Certain examples provide one or more methodologies to schedule resources that are available for radiology exams to help ensure that the exams can be performed as scheduled. Not all resources are needed for the entire duration of the exam, so the resources are scheduled only for the parts of the exam for which they are needed. Moreover the exam duration varies based on a number of factors. These durations are estimated by analyzing historical data so that exams can be completed in allotted times with high probabilities. In addition, utilization of the resources is automatically analyzed to enable better planning at hospitals and clinics.

Exams to be performed can be divided into subtasks that are to be performed consecutively based on resource requirements. Each subtask requires a different set of resources than those required by the subtasks that precede and succeed it. The time that is needed for the entire exam and for each of the subtasks is estimated. The estimation can be based on analysis of historical data on exam completion times and/or knowledge of experts in the domain, for example.

Prior Radiology Information Systems (RIS) did not have a capability to perform multi-resource scheduling to ensure that all the resources required for performing an exam are available as needed during the exam. Without multi-resource scheduling, delays can be introduced in completing the exams and resources are often under-utilized. A multi-resource scheduling methodology can schedule all resources needed by an exam. The methodology is capable of performing both automatic and manual scheduling, for example.

In some examples, availability of each resource involved in a task is obtained from a RIS and/or scheduling/calendar application (e.g., Microsoft Outlook™ and/or other electronic calendar) of the resource personnel. When a patient needs to be scheduled, the schedule/calendar is searched to find time slots where all required resources are available. The time slots are presented in increasing order of desirability to the scheduler. The scheduler selects a slot from those presented to schedule the exam. The patient and other medical personnel involved are then notified.

A scheduling algorithm drives the scheduling process. The problem of finding and ordering the available time slots can be formulated as a constraint satisfaction problem. The goal is to ensure that all resources needed for the exam are available when needed. When multiple resources can perform a task, the best resource is selected based on a number of user specified criteria. Existing constraint program solvers can solve this constraint satisfaction problem. Additionally, a heuristic algorithm has been developed to solve this problem by systematically searching linearly in time to find open slots when all required resources for the exam are available, for example.

Certain embodiments provide systems and methods for systemically organizing tasks and assets of a process to more effectively achieve immediate and longer-term macro objectives. In certain embodiments, scheduled tasks are organized using, for example, a critical path method (CPM) and the tasks therein are exposed to durations which are probabilistic and are either within the endogenous variation control of the system or are exogenous factors to which the system must be robust to. Measures of duration, availability and reliability to calculate an enumeration of scenarios in the context of variation is used to determine the probabilities of meeting a selected schedule (schedule risk). The probabilistic measures of duration, availability and reliability are functions of path dependent consumption and utilization decisions that are made to determine the use of the assets of the process. Using a multi-modality simulation methodology, for example, a process transfer function of the probabilistic measures may be derived. It is these estimates of duration, both endogenous and exogenous, that are described by simulation that create the task durations and logic for interdependencies which in turn are used to calculate schedule risk in the CPM method. Certain embodiments provide decision support to help make effective decisions in real time or substantially real time while embedded in a highly variable and interdependent process. These decision support embodiments can be automated or prescriptive to the process stake-holder.

Certain embodiments provide systems and methods to manage changes to a schedule to accommodate changes that are internally or externally induced and do so in a way that reduces or minimizes overall health delivery system throughput or quality degradation. Certain embodiments provide systems and methods to review what has recently happened in a process, to view actual current process operations, and to view what is on the schedule looking forward into the near term future. Specific assets such as plant & equipment, people, physical location and information are exemplary entities being tracked and dynamically managed.

Certain embodiments are adaptable and dynamically configurable such that activities can be rescheduled based upon, among other things, state(s) of patients, providers, and assets within a procedure and/or scheduled for a procedure. Increased adaptability and dynamic configurability help clinical systems and personnel to function more reliably and to be robust to exogenous forces outside of process control such as what symptoms patients present with, time of emergency, volume of patient medical demand, and the like.

Certain embodiments include Duration Estimator, Block Allocation Planner, Day View, Day Planner/Day Replay and Provider/Patient Kiosk as elements for information and decisioning designed to reduce systemic variations by eliminating schedule risk up front and enabling rapid on-the-fly response to unanticipated perturbations to the clinical process, for example.

Referring now to FIG. 1, a block diagram illustration of an example system 100 for use in planning clinical procedures is provided. System 100 includes a duration estimator module 110, block allocation planner module 120 and user interface 130 as described in detail above. While embodiments have been described with reference to a clinical setting, it is to be appreciated that other environments may also benefit from similar methods and modules described herein.

In some examples, the duration estimator module 110 is configured to characterize average duration times and variations from average duration times for a given procedure or activity. The block allocation planner module 120 is configured to schedule procedures or activities in accordance with characterized times from the duration estimator module. The user interface module 130 is configured to permit a user to visualize variation, to visualize scheduling opportunities and constraints and to view information output for use in scheduling procedures and activities. Each component or module will be described in greater detail below.

The Duration Estimator 110, which may be thought of as a 'better ruler to measure with', measures variation so that procedure times are more accurate and so that schedule risk is reduced.

The Block Allocation Planner 120 may be thought of as a "defragmenter" for reserving blocks of time. Much like a computer hard drive defragmenter, it re-sorts the time slots and rooms to be available for the booking of surgeries in such a way as to satisfy constraints and departmental objectives. It factors in preferences and availabilities and solves for the best departmental allocation of space and time and through the allocation, help achieve department policy objectives such as case mix, outcomes, safety and to provide incentive for desired behaviors.

The user interface 130 to the disclosed schedule decision support may include at least one of modules configured to permit a user to visualize variation, to visualize scheduling opportunities and constraints and provide output for use in scheduling procedures and activities, or combinations thereof.

In accordance with an exemplary embodiment, the scheduling system 100 is configured to aid in initially scheduling activities and procedures and is configured to visualize scheduling opportunities and constraints and will be referred to herein as "Day Planner". Day Planner may be thought of as a manufacturing requisition planner, it enables the scheduling of specific activities and all interdependencies—with the added benefit of simulating forward many alternative plans and contingencies.

In accordance with an exemplary embodiment, the user interface to the schedule manager as the process is occurring is configured to indicate and display variation along with suggestions as to "do-what" and enable "what-if" and will be referred to herein as "Day View". Day View may be thought of as a "radar" for the clinical process, it brings schedule with other location and clinical information so that the staff can know when schedule deviations are occurring, what the cause is, have a way to visualize process interdependencies, have the ability to play out or simulate alternative process decisions and ultimately get the process stakeholders constructively involved in proceeding forward in a manner that has their intellectual buy-in to the course.

A user interface module is configured to provide output for use in directing procedures and activities and will be referred to herein as "Provider/Patient Kiosk". Provider/Patient Kiosk may be thought of as workflow, the kiosk is information gathering and output for the various stakeholders in the clinical process. It gathers information that is later used to reduce variation and it interacts with the stakeholders in mediums that are natural extensions of their native environments. The user interface may include computer display and/or reports.

It is to be appreciated that the clinical process decision support methods can include one or more of the capabilities described above, as well as any combination thereof.

By having a procedure finish before the scheduled end time, potential scheduling flexibility is lost for other issues that inevitably arise during the day such as staff availability, rooms and equipment constraints. Potential throughput capacity might also be impacted in that, over the course of a day, one or more additional procedures could be inserted into the schedule if flexibility were provided.

A longer than anticipated procedure can have back up or delay other dependent procedures for a particular patient either in the original department or cross departmentally. Additionally, the rooms and assets that were originally allocated are no longer as available, and, therefore, other patients and activities are negatively impacted. There may also be unscheduled overtime of staff or extra costs associated with turning around apparatus. New schedules must be made that impact reworking of staff planning as well as the potential for rework on case preparation for following or interdependent procedures. The anticipated and/or needed throughput capacity may also be impacted negatively. These changes reduce operating flexibility and increase the anxiety of the clinical process stakeholders.

Certain embodiments provide a proactive application looking ahead at procedure scheduling and duration to avoid delays by triggering an advanced warning with sufficient time to respond in an event that scheduled procedures will start or end before or after their scheduled time. Certain embodiments provide recommendation regarding one or more specific decision(s) or action(s) can be taken to add, drop or move specific cases, task and assets, for example.

In certain embodiments, scheduling is provided that accounts for available personnel, available physical space, and available blocks of time, for example. Certain embodiments account for variations associated with fluctuating demand and asset availability.

In certain embodiments, multiple criteria may be set for a scheduling process. Additionally, various risks associated with selected criteria may be taken into account. Furthermore, rather than providing a single schedule that is designed with average or generic or judgmental time buffers to compensate for variation, certain embodiments enable a plurality of scheduling scenarios to be manually or dynamically entered or simulated automatically to explore an available solution space and ramifications on current and future activities. Certain embodiments provide suggested decisions calculated to help meet one or more static, dynamic or path-dependent configurable objectives.

In certain embodiments, a scheduler provides a capability to view a single or multiple process metric, agent, and/or asset of the process as well as a dynamic impact on interdependencies such that one or more causes of variation in that process may be explicitly communicated and understood. Certain embodiments enable a dynamic view to process risk along one or more dimensions in real time (or substantially real time with some inherent system delay) or historically, for example. Additionally, certain embodiments may prompt an alarm, action and/or warning if a certain process variable trips a threshold set point, for example.

In certain embodiments, multiple simulation modalities are employed including a critical path method coupled to discrete event, agent, Monte Carlo and/or continuous simulation. Using this coupling, one or more objectives of the process may be assessed.

In certain embodiments, Day View or other user scheduler interface provides features for historical review such as replaying a day or past several days in order to extract from and discover process dynamics, training, and knowledge capture for future use as well as for administrative activity cost(s), protocol verification and billing, for example.

Utilization and asset consumption may be viewed to help understand a state of dynamic interdependencies between scheduling processes and to help determine which a schedule is likely to be met. If a determination is made that a schedule is not likely to be met, data may be viewed and/or used to help identify what assets and interdependencies are causes of schedule variance.

A future schedule view may be provided to calculate "what-if" scenario testing to help understand schedule changes and effects of endogenous variation, such as schedule adds or drops, resource availability, unforeseen delays or failures, etc. Future schedule extrapolation helps to enable a higher process entitlement via better decisions that directly and indirectly affect variation and throughput, wait times, stocks, capability and uses of assets in procedure and resource scheduling.

Thus, certain embodiments provide scheduling of processes in highly dynamic environments where knowledge workers and service providers are integral agents of the process, rather than providing singular or discrete schedules with an objective and buffers allocated by judgment or heuristics alone.

Day View can estimate durations from a historical book or record of business. If no historical data exists, data from other related facilities may be used, for example. In certain embodiments, users can subscribe to services to receive or exchange data to aid in duration estimation and other calculation, for example. Additionally, access to other user data can allow comparison of procedure times between users/institutions, for example. After duration estimation, block allocation occurs. Then, interdependencies (e.g., one x-ray machine needed in two rooms; people, surgeons, instruments, etc., needed in multiple places/times; etc.) are planned into the schedule. Then, Day View monitors activity as the day progresses in order to add, drop and/or otherwise intervene in a schedule with automated adjustment and/or decision support. Other input, such as electronic medical record (EMR) systems, healthcare information systems (HIS), status/monitoring systems (e.g., radio frequency identification, RFID, patient call systems, patient bed monitoring, clinical systems and etc), optical recognition for shape of instrument/operating room activity, devices (e.g., electrocardiogram (EKG), anesthesiology, etc.), interaction with other processes, manual observations, staffing/equipment availability, may feed into Day View for correlation with a schedule or protocol.

In certain embodiments, a determination of an initial view of a schedule may be prefaced by a sequence of analytical work. Activity durations are utilized to schedule time within available limits. In an example, blocks of time are defined within which procedures may be booked for or by those entitled to provide clinical service.

Responsible scheduling is considered to include an estimate of duration and a block of time allocation within which the procedure is considered likely to finish. While under-scheduling procedure time creates delays in subsequent procedure starts, over-estimating and blocking time for available assets may create under-utilized capacity.

When average duration forecasts are used in a clinical environment, and each room is considered unique outside the context of the staff's before and after tasks, chaos often results from concurrent demands. Utilizing probability density functions of time for a given duration estimation of a surgery is a foundation for calculating a schedule's risk and system level performance or optimization, for example.

In an example, a probability density function (PDF) of time for a procedure is calculated, typically from historical records of similar procedures. The historical frequencies, in histogram form, for example, are normalized by one or more standard statistical techniques to create the PDF with area=1. Certain embodiments record information including actual procedure code(s), time(s), staff patient specifics and process environment, for example.

Certain embodiments facilitate dynamic, intelligent schedule change based on changes in the actual stochastic and interdependent processes of care occurring in the hospital. This method requires forecast durations of procedures arranged within a schedule along with interdependencies of space, people, equipment, consumables and information. Actual process feedback is provided such as from an information system, RFID, optical recognition, telemetry, and/or various other clinical systems. An explicit mapping of interdependencies in process assets and their related task probabilistic durations of activities can be coupled to the system's simulation capability for finding feasible solutions.

Examples of events necessitating modification to the schedule include staff and equipment unavailability, upstream or downstream processes not able to provide or receive patients, devices needed in the scheduled tasks not functioning, people and equipment not in planned location, inputs from clinical or administrative systems not adequate, patient biomedical adequacy or health status not within specification, added procedures not in the schedule, and dropped procedures for any reason. The schedule can be modified by changing assumptions in the activities used to create the schedule or dynamically managed in the Day View system. The changes to assumptions can be manual or computer generated to exploit feasible solutions.

In an environment involving many interdependencies, variation in any interdependent factor can propagate process disturbance. Certain embodiments help facilitate understanding and proactive management of factors that, if delayed or accelerated from plan, will likely increase the probability of delay and preclude a process operating objective from being met. Relevant algorithms can be executed using methods and systems disclosed by Akbay and Alkemper known as Decision Execution System, via hard-coded computer logic, and/or via configuration of commercial Extract-Transform-Load and workflow tools, for example.

Key interdependencies can be identified around consumption and utilization of assets in a process. These interdependencies can be captured, for example, using a critical path method (CPM) transfer function technique. Critical paths are calculated using method known in the area of management sciences. Critical path and process slack times are made explicit via calculation and display, for example. A critical path can be calculated knowing the structure of interdependencies and state of the assets in the process using one or more Gantt and CPM methods, for example.

Certain embodiments use simulation to explore potential feasible solutions. For example, four modalities of simulation are employed to forecast asset and resource utilization assumptions. These four exemplary modalities are agent based simulation (AB), discrete event simulation (DE), continuous or system dynamic simulation (SD), and Monte Carlo simulation (MC). A critical path method (CPM) can also be repurposed in a simulation-based mode in that CPM is used to calculate critical path, probabilities of completion, and availability and feasibility of a solution.

In some examples, dynamic system context and interaction between a variety of simulation and forecast modalities are analyzed for scheduling purposes. Different simulation and forecast modalities can be utilized, for example. Critical path methods and forecast modalities can be utilized, for example. Methods such as CPM, DE, AB, MC, and/or continuous, differential or system SD, can be used. Historical observations may be organized in the form of a histogram and transposed into a probability density function and a cumulative probability density function (PDF) for incorporation into the CPM logic and as assumption feedstock for the simulations, for example. Using a number of different simulation modalities concurrently to solve forward-looked aspects of a schedule can help determine what will happen during the day, for example.

In some examples, methods and systems are differentiated from Gantt and Program Evaluation and Review Techniques (PERTs) that replace deterministic duration assumptions in CPM with task duration probabilities. Certain examples not only draw from a static assumption of a probability distribution function such as PERT or Gantt but also provide duration probabilities from coupling to a simulation of the physical environment. Thus the CPM or PERT method is enhanced with a most recent actual duration that is observed within the hospital's or other clinical environment's operations from protocols that are tied to the specific care pathways for each patient and also an added precision of dynamic forecasts of duration that result from incorporation of process signals and activities on a dynamic basis into probability assumptions feeding CPM/PERT.

Beyond minute to minute, hourly, shift, daily, weekly, monthly, and/or other operational time constant within which tasks of a process are scheduled and work, there are typically additional process objectives to be managed and traded against as well as throughput, inventory, operating expense and ability to fulfill. These objectives can include scheduling and scheduling risk management methods. These macro objectives include budget, asset and staff investments, such as, for example, capitalized equipment, consumable stock, physical plant, staffing levels, staff competence and recruited staff. Having actual capability, capacity, and cost structure allow more effective use of asset and staff investments. An ability to attract more inputs into the system or adversely exclude entrants that the process system would not be advantageously suited to serve may be provided in Day View. Certain embodiments provide an ability to create economic value addition or an ability to meet financial targets, for example. A virtuous cycle that creates re-enforcing dynamics has dynamic counter forces and limits to growth. Attracting more entrants into the system than the system can sustain with expected or required service levels results in staff burnout or poor process outcomes. Over investing in capability whose cost cannot be liquidated result in financial loss that may not be sustainable. Served markets may not have sufficient volumes to sustain entrants into the process system built with an operating (and cost) structure that is designed for more (or different) volume. Certain embodiments allow process stakeholders to utilize both immediate process decisioning and policy and strategic decisions in such a way as to make informed decisions with probabilistic trade-offs.

In certain examples, methods and systems are disclosed that use constraint satisfaction techniques to schedule multiple resources to help ensure exams can be performed when and where they have been scheduled. Not all resources may be needed for the entire duration of an exam. Therefore, disclosed systems and methods can schedule resources only for the parts of the exam where they are needed. Systems and methods can jointly manage the clinic-wide concurrent and temporal demands on resources.

In some examples, a radiological multi-resource scheduler incorporates an economic value calculation for under-utilized (and/or a constraint release value for oversubscribed) assets; temporally dependent constraints such as those associated with contrast agent protocol execution; efficient routing decision support based upon a multi-resource schedule; use of forecast and forecast confidence intervals at the time of inquiry and booking in a radiology info system; throughput limitation attribution analysis for radiological departments; and/or multi-clinic resource planning and real-time what-was, what-is, forecast and what-if analysis for throughput and resource utilization both in aggregate and temporal form, etc.

Exam task durations can vary based on a number of factors that are incorporated at the time of scheduling. These durations are estimated from analyzing historical data so that exams can be completed in allotted times with high probabilities, building upon the art disclosed in U.S. Patent Application Publication No. 2009/0122618 ("Using Biometrical Information for Scheduling"), incorporated by reference herein in its entirety, which correlates the length of procedures with a number of factors such as patient's weight and medical state and then uses that information to reduce the duration forecast interval when scheduling. U.S. Patent Application Publication No. 2009/0119126 ("Method to view schedule interdependencies and provide proactive clinical process decision support in Day View form") is also herein incorporated by reference in its entirety and manages throughput and scheduling risk.

Figure 2:
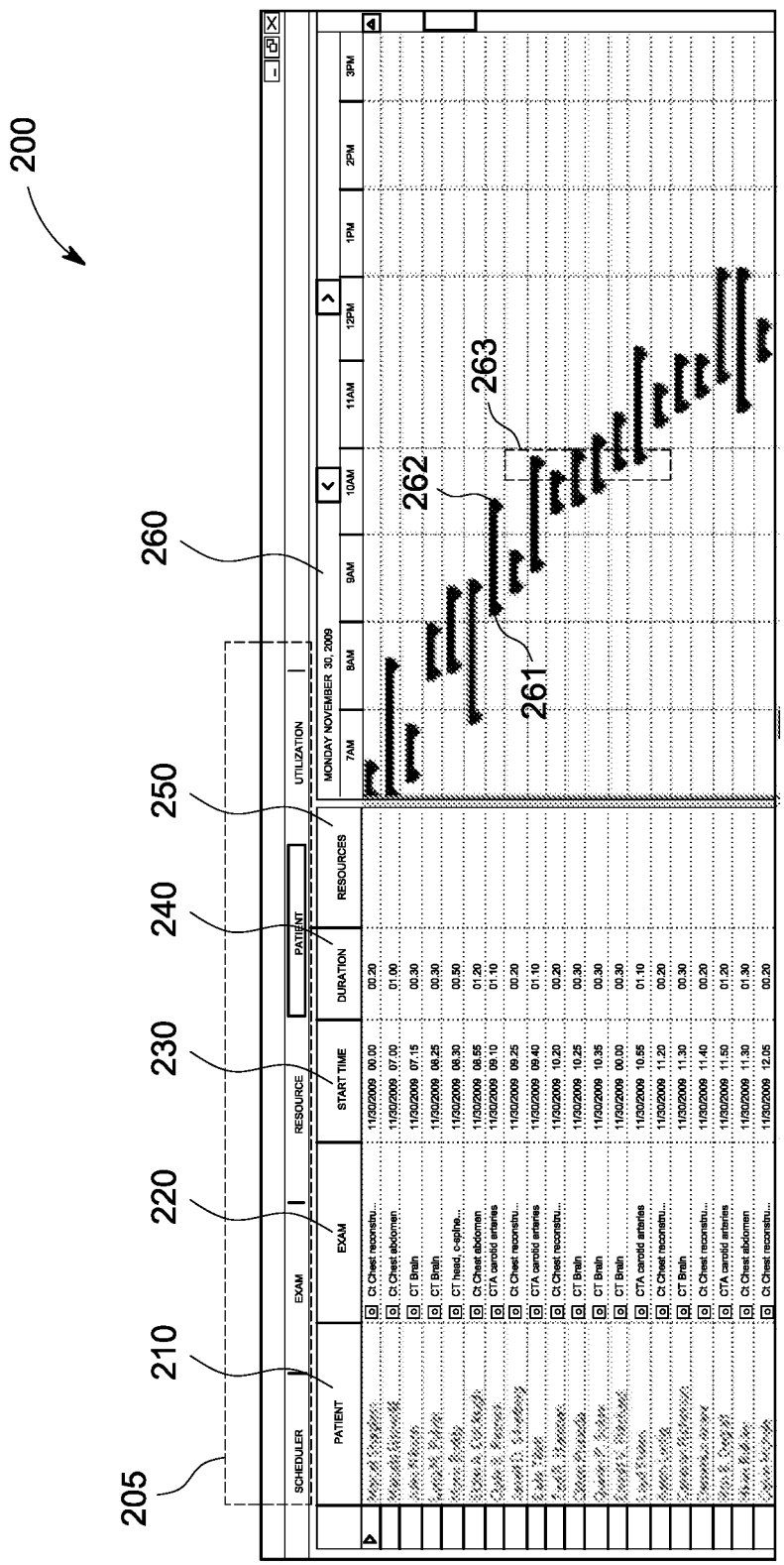
FIG. 2 illustrates an example of patients scheduled by day in radiology departments.

FIG. 2 illustrates an example of patients scheduled by day in radiology departments. Patients are scheduled into available appointment time blocks. It is appreciated by clinicians that, on average, there is slack or flexibility in these time slots such that either emergency cases can be absorbed and the pre-scheduled ones can flex or the scheduled cases will have over- and under-runs that will balance out at the end of a shift. A result is that patients wait and certain staff face unfeasible demands on their time and attention. FIG. 2 depicts the paradigm disclosed here-in, where the schedule is not fixed into set time increments but rather results from the interdependencies of resource availability, clinical tasks and task durations. Staff can be booked on several concurrent cases, yet at the task level the clinical workflow is arranged to allow feasibility by the disclosed system.

Figure 3:
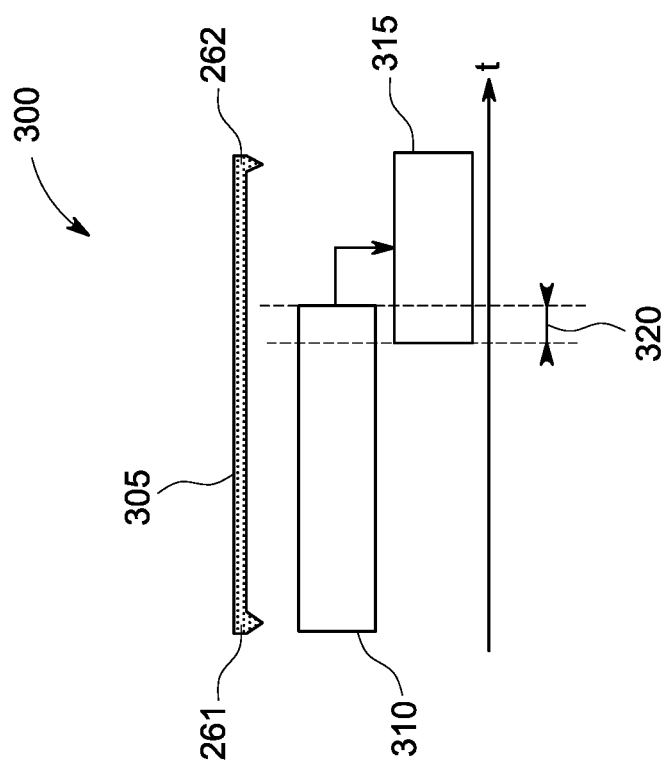
FIG. 3 depicts an example of clinical tasks and resources within a scheduled duration.

FIG. 3 depicts an example of clinical tasks and resources within a scheduled duration. Tasks consuming the same resource have a temporal interdependency when there is mutual exclusivity. Certain examples accommodate temporal interdependencies by treating them as a constraint to help ensure resource availability at the task level upon a schedule request. Using a Gantt approach, deterministic durations are utilized. Certain examples use either a deterministic or probabilistic duration, setting as an objective the level of acceptable schedule risk versus idle capacity. Either or both system level throughput and economics are objectives facilitated by certain example systems and/or methods.

Figure 4:
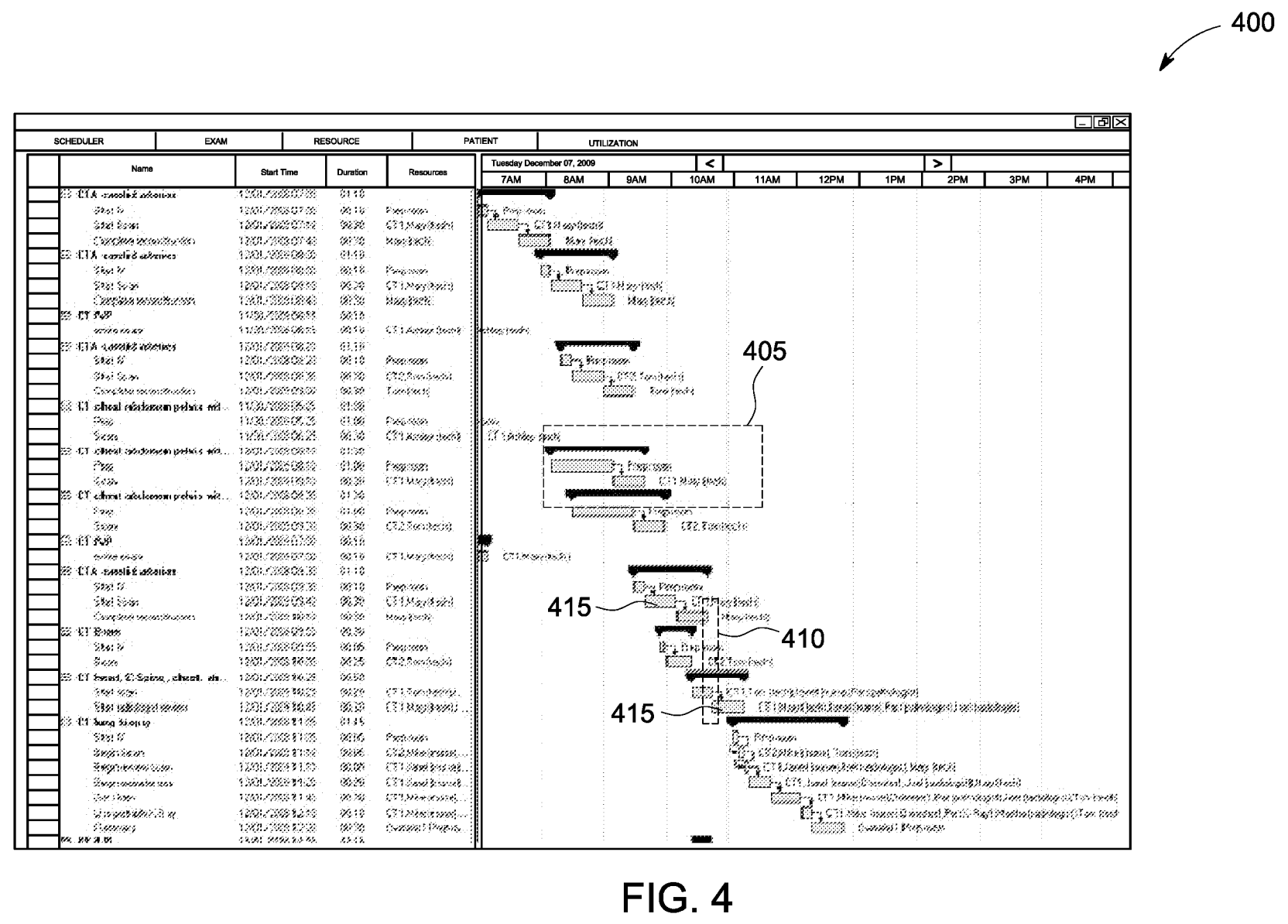

FIG. 4 shows example clinical tasks and resources within a scheduled duration. Staff decision-making is facilitated with a view of tasks, resources, patients and their relationships. What-if scenarios for case additions, forecasted or actual duration changes and schedule changes can be assessed with visual constraint output in real time.

Figure 5:
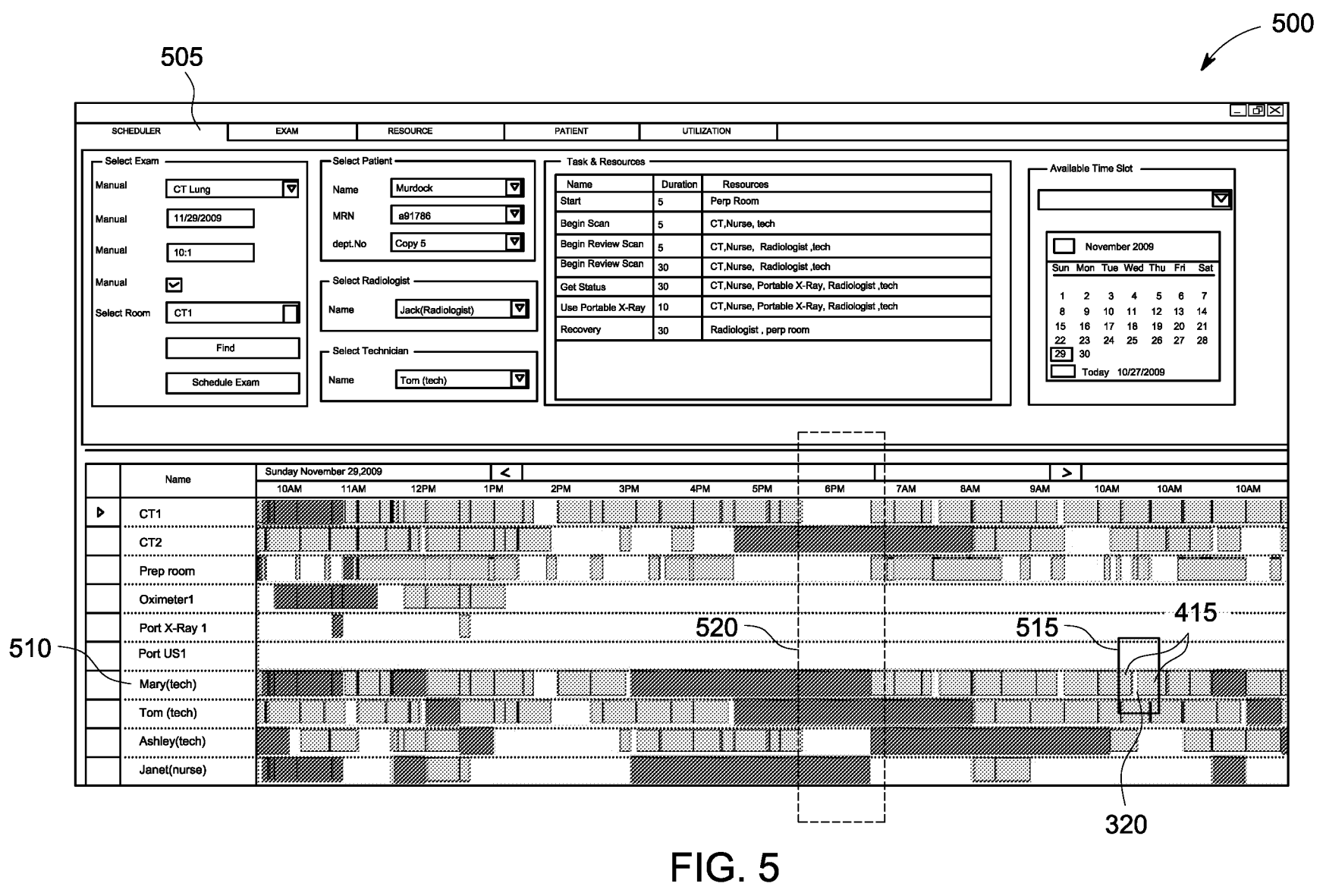

FIG. 5 illustrates an example of resource constraint and routing. Resources, such as staff, can be viewed with respect to time for the summation of all assigned clinical tasks. A further improvement considers not only unfeasible multi-tasking but transport times as well. Further, in large or distributed clinical settings, a scheduling constraint satisfaction algorithm can provide case scheduling to facilitate optimal routing of people and assets.

Figure 6:
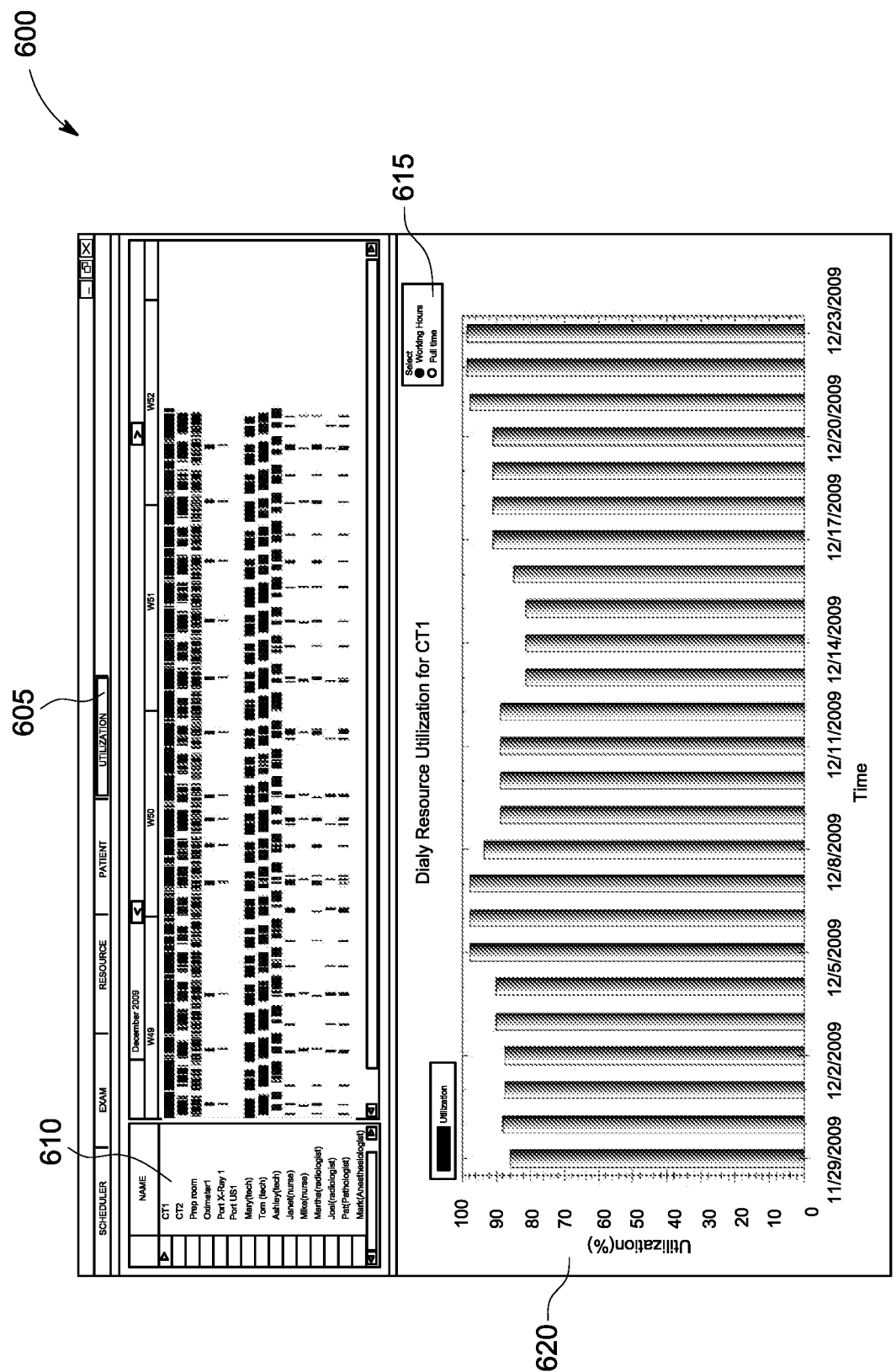
FIG. 6 illustrates an example resource utilization analysis.

FIG. 6 illustrates an example resource utilization analysis. Whether by shift or over a 24 hour day, clinical loading and balancing can be obtained by aggregating from the task level. Additionally, the economics of shift coverage, labor overtime and asset quantity may be traded off against historical or theoretical cases.

Certain examples divide exams to be performed into subtasks that are to be performed consecutively based on resource requirements. Each subtask requires a different set of resources required by the subtasks that precede and succeed it. The time that is needed for the entire exam and for each of the subtasks is estimated. The estimation can be based on analysis of historical data on exam completion times and/or knowledge of the experts in the domain.

Availability of each of the resources is obtained from a clinical information system (e.g., a RIS) and/or a calendar/scheduling program (e.g., Microsoft Outlook™ and/or other electronic calendar)) of the resource personnel and assets. When a patient needs to be scheduled, disclosed methods and systems search to find all time slots where all required resources are available. Time slots are presented in the increasing order of desirability to the scheduler. The scheduler selects a slot from those presented to schedule the exam. The patient and other medical personnel involved are then notified.

A problem of finding and ordering available time slots can be formulated as a constraint satisfaction problem. An objective is to help ensure that all resources needed for the exam are available when and where needed. When multiple resources can perform a task, the best resource is selected based on a number of user specified criteria. Existing constraint program solvers can solve this constraint satisfaction problem. A heuristic algorithm for solving this problem is disclosed as an alternate to the constraint-programming algorithm. The algorithm involves systematically searching linearly in time to find open slots when all required resources for the exam are available.

The disclosed systems and methods improve radiological scheduling in a number of ways. For example, systems and methods provide multi-resource scheduling of patients, resources/equipment, and required staff for defined durations. Multi-resource scheduling can take into account location of resources considered in the schedule and perform pre-scheduling and/or real-time scheduling, for example. Multi-resource scheduling provides an ability to communicate with Microsoft Outlook™ for scheduling, creating staff resource appointments, etc.

Certain examples provide a scheduler loaded with pre-scheduled exams. The scheduler uses resource historical information to calculate possible areas of over and under resource utilization. The scheduler provides resource schedules for rooms, equipment, and staff at a glance. Views can be user configurable in real time, for example.

Communication with the scheduler's pre-scheduled exams can be used to correctly schedule new exams based on following criteria: scheduling algorithms, a resource scheduling template, an exam template, an exam in resource template, patient conflicts, staff resources, etc. Scheduling algorithms can operate based on one or more criteria/guidelines such as first available, horizontally fill rooms, etc. The resource scheduling template can include one or more room open/closed templates based on patient types, for example. The exam template can be used to schedule or not schedule an exam based on patient type. The exam in resource template can be used to schedule or not schedule an exam into specific room(s) based on patient type. Patient conflicts can include one or more of preparation time, a previously performed and/or future scheduled procedure with conflicting contrast, contrast fade time, similar exam checking, etc. Staff resources can include selecting a specific person based on availability, generic resource, etc.

Certain examples provide scheduler resource optimization based on affects of addition of emergency procedure(s) and/or affects of lengthier procedure duration. Staff can be alerted to reschedule. Patients can also be notified. Resources can be manipulated based on a resource's current schedule. Both room and equipment resources, as well as staff resources, can be optimized and/or improved.

In certain examples, information for scheduling includes exam detail, staff resources, additional equipment/resources, etc. Exam detail can include performing resources, resource templates, exam templates, exam in resource templates, duration of exam, exam protocol, contrast conflict, procedure preparation time, modality type, etc. Staff resources can include a specific duration for each staff resource (e.g., for a select generic and/or specific resource). Staff resources can be integrated with an electronic calendar/scheduling program to schedule based on staff availability, for example. Additional equipment/resources can include a portable resource, a waiting and/or observation room, injection preparation room and/or time, etc.

Certain examples accommodate both initial scheduling and future scheduling. For example, the referring provider's office calls to schedule an outpatient appointment. The appointment is visible by browser and/or integrated into the provider's system. In the example, the exam requires IV insertion prior to start of the exam in a prep room. The schedule incorporates clinical response time for contrast agents and ensures diagnostic imaging activity is within protocol. The schedule also includes a patient duration in the prep room. The scheduler also accommodates various staff resource(s) required for tasks as well as time in those task(s). The scheduler notes which resource(s) will be used in the exam and derives a total exam duration from task forecast and temporal feasibility, for example. The scheduler determines an exam completion risk evaluated by imposing a desired schedule duration on the exam. The scheduler can also note whether a portable unit will be used partially in the exam. Post exam patient observation requirements can also be incorporated into the schedule.

When scheduling an emergency examination, the scheduler notes the emergency procedure and conducts real time (or substantially real time) scheduling of the exam based on information regarding room, equipment, staff, etc. The scheduler may need to manipulate the present schedule to reallocate room, staff, resources, etc., so the scheduler provides a user with an ability to manually view room, staff, resources, etc.

Certain examples provide an ability to manually schedule the emergency exam with correct resources. The scheduler depicts the new emergency exam added to schedule and its impact on other activity and resources. The scheduler can help optimize the current resources based on addition of the emergency exam. The scheduler can alert a front desk (e.g., patient tracking resource) to update patients about delays or reschedule patients as appropriate, for example. Scheduler input/output can be provided to hospital flow control such as GE Whole Hospital Optimization™.

Certain examples illustrate a use case for scheduler optimization. Certain examples project optimal utilization of resources room/equipment/staff based on historical data. The scheduler can display staff schedules including appointments entered in an electronic calendar program, for example.

In some examples, a radiology scheduling system enables efficient and comprehensive use of diagnostic imaging while also achieving departmental level throughput and/or capacity to serve and economic objectives. Procedures can be scheduled in advance and/or accommodated on an ongoing and/or emergency basis. Users can include schedulers, clinicians performing the resultant workflow, and management analysts.

Efficient and comprehensive use of people and assets lowers the overall cost of radiological services, decreases the probability of clinical errors whose root cause is personnel or equipment overloading, decreases the occurrence of wasted procedures where radiological preparations and imaging were not executed per the medical protocol, and also helps ensure access to diagnostic imaging balanced by the constraints of staff and equipment availability and economics.

To achieve these objectives, the tasks of radiological services at the clinical workflow level and their interdependencies must be managed through time. Only reserving an asset such as a piece of diagnostic imaging equipment for a set block of time, as is the current art, ignores the realities that a given clinician may be required to be in more than one location at the same time or that clinical workflows have temporal constraints such as adequate time for contrast agents to diffuse, yet not expire. Multiple resource scheduling advances the process and outcomes of radiological services.

In certain examples, the multi-resource radiological scheduling systems and methods disclosed here-in operate in two modes. In an analytical mode, historical and/or theoretical cases, actual and/or proposed staffing, and other resources are used, and a department is analyzed off-line for improved operation opportunity assessment. In an operating mode, the system schedules cases in advance of the actual clinical activities and then dynamically assists in the clinical workflow analysis and control as those procedures are executed.

Certain examples improve scheduling with a capability to build schedule durations from the task duration and temporal interdependencies up rather than simply allocating defined increments of time, such as in 15-minute blocks. This is a significant advancement in the art of scheduling and managing a radiological department because the concurrent scheduling of resources and the ability to dynamically manage protocols with various levels of intensity over time, such as perfusion which has a dosing, wait and imaging cycle that does not require uniform clinical resource consumption. Previously, perfusion and imaging activities have been treated independently of each other and of other clinical activity in the radiology department. Certain examples overcome many protocol execution defects by specifically managing the tasks of a given protocol longitudinally over time. The schedule, therefore, is a function of resource availability, clinical tasks and task durations. Staff can be booked on several concurrent cases, yet at the task level the clinical workflow is arranged to allow feasibility by the disclosed systems and/or methods.

In addition to the temporal aspects of each resource, there is a spatial component. The multiple resources needed for a procedure must be available where needed. Traditional methods to lower the impact of not having apparatus where there is a need to have them is to purchase more assets rather than managing the workflow and location staging of mobile apparatus as the disclosed system does. The present systems and methods consider transport time in large clinics and in venues where distributed workflow occurs, such as, for example where a perfusion is administered to a hospital in-patient who is then transported to diagnostic imaging apparatus.

Routing decision support based upon the multi resource schedule is provided. Though real time location information is not required, it may advantageously be employed in at least one example. Operations Researchers, Management Scientists and Industrial Engineers are versed in a class of routing optimization algorithms typically referred to as Traveling Salesman solutions. Certain examples implement these algorithms in radiological scheduling and control. By the advantageous application of this art in radiology, routing decision support is provided. With real time location information, certain examples estimate transportation time and enables transport management. Further, in large or distributed clinical settings, the scheduling constraint satisfaction algorithm can provide case scheduling to facilitate optimal routing of people and assets.

Certain disclosed systems and methods, because they are designed to manage at the protocol task level, are advantageously able to compare what is required to be at a certain location and time per the multi-resource schedule to the actual availability of each of the resources. A status is provided to the clinicians when location data is available, such as, for example an RFID asset tracking system. Status of people location can be obtained from their own calendar management infrastructure, provided that the activity and location refresh rate is faster than the radiology department workflow task durations being managed by disclosed systems and methods. Though improbable, the system does consume outputs and provide inputs to calendar management infrastructures.

It can be appreciated that it is easier operationally to schedule a major fixed asset, such as a MRI machine than to also schedule a series of workflows that consider where staff and ancillary assets such as portable ultrasound devices are. It is assumed that other resources will flex to the needs of a scheduled procedure on a large stationary asset. When this is not possible on an ongoing basis, staff or other resources are added to the radiology department.

As a radiology department becomes very busy (e.g., over 90 percent capacity utilization), interactions between resources and physical locations with the activities in a healthcare facility (e.g., a hospital, clinic, physician's office, etc.) can materially impact throughput and the delivery of quality care. This is a result of the interdependencies and randomness of the demands on shared resources, for example. It can also be appreciated that while on average, a radiology department may run at 75 to 85 percent of theoretical capacity; there are multiple episodic excursions on a daily basis into the maximum utilization of staff or other shared resources. Observable symptoms of this dynamic can include late procedure starts, clinical errors such as impartially executed and incorrect protocols, rework of imagining for lack of correct perfusion management, patient wait times, and staff anxiety, for example.

In some examples, systems and methods can operate based on work shift, 12-hour, and/or 24-hour mode.

In some circumstances, the economics of a department may not allow the addition of more resources to serve peak demands. However, due to the hidden cost of imaging rework and the need for flexible capacity to accommodate exogenous demand created by emergency procedures such as stroke patients (who take precedence over scheduled procedures in radiology departments co-located at hospitals), it is highly desirable to be able to manage through excursions when the radiological department's resources are in very high utilization.

Certain examples enable the calculation of capacity utilization given staff scheduling, physical assets, a patient demand and resulting protocols. Further, certain example systems and/or methods, because of their specific management of radiology resources at the task level, can calculate activity cost in addition to approximating the revenues from the case mix being superimposed onto the department.

Alternatively, given any limiting constraint or combination there-of on theoretical capacity entitlement, certain systems and/or methods can estimate the opportunity costs of a constrained resource (e.g., staff, schedule of staff, diagnostic imaging equipment, ancillary equipment, physical plant, case mix and volume and various versions of a protocol, etc.).

Certain examples additionally calculate the temporal aspects of constraints. Examples include the identification of how many of certain protocols can be executed under given demand scenarios, how long a queue will build, by time of day, under various operating scenarios of the radiology department (emergency procedure add, staff leaving, equipment downtime), etc.

It can also be appreciated that a radiological department, especially a co-located or shared one with a hospital, does not operate without interdependency on the clinical workflows of that hospital. Previously, simplifying operating modes were created to minimize the coordination between hospital clinical activity and diagnostic imaging. An example of such an operating mode is for the radiology department to take primarily outpatients in the morning and inpatients in the afternoon. The theory was that outpatients must travel to the clinic while inpatients can in effect be queued by staying in the hospital until the outpatient demand is satisfied.

One opportunity lost in such simplifying operating modes is at the system level. There is also a holding cost for inpatient bed occupancy. For example, the accumulated delay resulting from diagnostic imaging is often sufficient to result in patients not being discharged when they otherwise could have been. A result is lost capacity in the hospital with resultant additional reimbursements. Disclosed systems and/or methods enable joint management of clinical activity whereas the prior art could not for its lack of ability to manage multiple resources at the task level.

Beyond the coupling of a radiological department with a hospital, for example, resources can be managed across a multitude of clinics that are geographically separated such as within a city or region.

Disclosed systems and/or methods load and balance the workflow of a radiology department (or multi-site coordinated departments) by aggregating resource consumption as a function of time from the task level. In an analytical mode, the binding constraints are calculated as well as the slack values of relaxing those constraints. In an operating mode, the system schedules and manages workflow to the department's binding constraint.

System(s) and/or method(s) can be deployed in an analytical and/or operations mode. For example, in the analytical mode, scenarios of actual patient demands or theoretical ones may be considered for what-was, what-is, forecast and what-if analysis for throughput and resource utilization both in aggregate and temporal form. In the operational mode, the multi-resource scheduling system manages the tasks of radiological departments.

Because at least certain disclosed system(s) and/or method(s) schedule at the task level and subsequently calculate the aggregate duration, and because the system(s) and/or method(s) facilitate estimation of scheduled risk (a method of which is also disclosed in U.S. Patent Application Publication No. 2009/0119126: Method to view schedule interdependencies and provide proactive clinical process decision support in Day View form, which has been incorporated by reference herein) to manage throughput and scheduling risk, it is therefore required that the task durations of the protocols being managed be input.

Certain examples use either deterministic or probabilistic task duration for radiological department scheduling and analysis. These durations are obtained a-priori from clinical experts, statistically characterized historical data of the given radiology department, industry norms or peer groups.

Users in operating mode are predominantly of two roles: those who schedule radiological services in advance and the clinicians who are executing the protocols related to diagnostic imaging. Operations users do not typically have a comparatively long time to assess the state of the schedule and clinical activity as would an analyst using the system in an off-line mode. Certain examples thus provide visual analytics in the form of task detail, the status of tasks such as their relationship to the critical path or being a binding constraint, location information if available and the relationships of tasks to each other and to the multiple resources in the radiological department and beyond if so configured (for example, integrated into the flow control of a hospital and/or real time location based infrastructure and other interdependent clinic's systems).

Users interface with certain example systems by active mouse dragging and dialog boxes that have intelligent, contextually relevant content from which to select, for example.

Schedulers select a slot from those presented to schedule procedures. The patient and other medical personnel involved may then be notified in an example by typical components and infrastructure such as pagers, visual bed boards, PDAs, calendar systems and etc.

Referring to FIG. 2, a user is presented 200 with categories in tabular form 205 such as scheduler information, exam data, resource requirements, patient information and utilization. Highlighting information tabs subsequently displays contextually relevant information, an example being that of patient data. Example patient information includes an identification field 210 that is configurable to display a patient name or an anonymous representation of a unique individual for privacy purposes, such as those required by HIPPA when the system is deployed in a manner that others than clinicians may view the screens. Relevant and configurable data such as procedure 220, start time 230, duration 240, requisite or exception resources 250 and schedule 260 are available along with task aggregated procedure durations.

In certain examples, disclosed methods and systems can operate in a number of exemplary configurations. In one example, task durations that result from the execution of specific protocols and are interdependent upon resource availability are aggregated. An example task duration aggregation is depicted in FIG. 2 and will be further described with respect to subsequent figures. Alternatively or in addition, set durations, such as a block of time, can be imposed as is done in the current scheduling art. Certain examples provide both duration approaches as well as resultant task management and schedule risk calculations.

Referring again to FIG. 2, a given patient's procedure is characterized as having a starting time 261 and a forecasted completion time 262. How the tasks that are being managed to create the forecast will be enumerated in FIG. 3. It is notable that at a given time window 263, many procedures are concurrently being executed. As can be appreciated, there may be interdependencies there-in because the same clinicians may be performing radiological services to multiple patients in this window.

The relation of a single procedure's clinical tasks within a scheduled duration are described in FIG. 3 as is a method to aggregate tasks to derive the total scheduled time and the mechanism/procedure by which requisite resources are reserved. A protocol 300 includes two tasks with a calculated duration of duration 305 that begins at time 261 and is forecasted to be complete at time 262. The temporal relationship is that task 310 is performed first, followed by task 315. Tasks can be serial or parallel and the determination thereof is established by a radiological protocol. A serial relationship is depicted 300. Task 315 is illustrated as beginning prior to the completion of task 310 by a length of time 320. This condition occurs when the duration 305 is specified as being fixed or if the completion time 262 is after the end time of task 310, for example.

In prior methods of radiological scheduling, tasks and their requisite resources are not considered discretely. An example of a specified duration 305 is scheduling into a defined block of time such as one hour from 8 AM to 9 AM. The two tasks may be achievable in that duration if resources are available when and where needed. However, if an interdependent resource, such as a certain technician who is also servicing another patient, is not available for the present patient, a task such as 310 runs late. Disclosed system(s) and/or method(s) minimizes the probabilities of the same resources being a binding constraint when concurrent demands are made. Each task, 310 and 315 specifies what resources are required in their execution.

Considering the exam's required resources within a scheduled duration, FIG. 4 depicts task and resource information 400 under the system's example embodiment Exam tab 220. A certain clinical protocol that is scheduled 405 requires two tasks that are specified a-prior as part of the radiological department's protocol conventions. Each task requires certain resource types, also specified a-priori in the protocol conventions. The disclosed system facilitates the concurrent execution of many protocols and different conventions for those protocols. This feature is enabled with a completely data-table driven relational logic and provides dialog boxes for specific configuration, such as, what available resource is to be scheduled against a discrete task or generic task type or other operating heuristic particular to a given radiological department. Additionally, an optimization algorithm can assign resources to tasks.

The procedure 405 specified two tasks, "Prep" and "Scan" which subsequently called resources. Returning to FIG. 3, procedure 405 of duration 305 in length can be thought of as having task 310 as "Prep" and 315 as "Scan". The "Prep" task 310 called the "Preparation Room" as a resource while "Scan" task 315 called resource "CT1" and a Technician, who in the example embodiment is "Mary". Technician is an example of a resource type and Mary an assigned resource of that type who met configurable assignment heuristics, a user specified manual selection or a selection made by the optimization algorithm.

Resources 415 assigned to the tasks in protocol(s) of procedure 405 are concurrently engaged in the execution of other procedures 410. The explicit scheduling assignment at the task and resource level are managed. The resultant clinical workflow being performed by a given person such as "Mary" to complete multiple tasks with several patients is constructed to avoid mutually exclusive tasks at the time of scheduling.

Scheduling typically begins weeks, days and hours ahead of the actual clinical care as well as in real time when, for example, an emergency patient presents such as a person being assessed for stroke (when time is of the essence). A schedule that had been stabilized may therefore be dynamically reconfigured for the new need and the workflow along with timing of all radiological resources is instantaneously (or substantially instantaneously) calculated. Further, interdependencies such as transport and staff can be notified of a change before effort would be wasted. Additionally, the temporally dependent protocols impacted, such as those with perfusion, can be dynamically rescheduled so as to minimize the likelihood that they will be lost, as is the often occurrence with prior methods of radiological scheduling.

Referring to FIG. 5, resource constraints, such as concurrent activities, schedules and spatial logistics, are managed. The scheduling detail 500 is selectable 505 from the various other multi-resource scheduling components 205. Specific resources 510 may be manually scheduled or assigned by algorithm. The resultant scheduling workflow, by time and duration for each resource is calculated. By aggregating from task to resource, a determination can be made regarding what radiological department availabilities exist or can exist with rescheduling. In the example depicted in FIG. 5, a number of resources have capacity at 6 PM 520. A new case or a case from earlier in the day that was impacted by a change can include protocols that these available resources can service. If so, a case is scheduled and resources are reserved, with their workflows thus updated. Resources and resource types not available when a demand is present are considered as binding constraints that have an economic value proposition associated with them.

In an off-line mode used for radiological department analytical assessment, the pattern of economic and service capacity that is available or is lost is aggregated to provide the analyst with decision support information to make clinic investment, staffing and service line recommendations.

Returning to the management of task to task timing whose dual management purpose is to avoid delays for lack of a resource as well as to factor in transportation time, a window of time 515 is considered. Continuing with prior example, the same resource 415 is scheduled for two tasks as part of different procedures with different patients located in different areas. Should the spatial distance between those activities be such that excessive time is lost (excessive being characterized by its duration being sufficiently long that it unacceptably decreases the probability of completing the requisite clinical task to which one is transporting to), then it is desirous to have sufficient time 320 between tasks. In an example, the heuristic to reason if physical space resources associated with two adjacent tasks are sufficiently spatially separated thus requiring time to move between them and that the transport time relative to the task time decreases the task completion probability below an adjustable level.

Managing the capacity of the multiple radiography resources is provided in certain examples. Referring to FIG. 6, resource utilization analysis 600 is achieved in the example within a section focused on utilization 605. Consider the resource CT1 601 being analyzed for daily working hour 615 capacity utilization 620. It can be appreciated that the time scale of analysis can be any time increment from minutes to hours, shifts, weeks, months and years for whatever part of the daily operating cycle.

Radiology multi-resource scheduling requires a tradeoff between the clinical throughput and its resulting services revenues and the cost of having resources that create the capacity to serve. Certain examples provide an ability to assess service level and economics. Capacity utilization is an example of a metric that is calculated to provide the analyst decision support. On an annual basis, a resource, on average may have utilization that is significantly below a daily or seasonal peak. The analyst can explore policy decisions such as staffing for peaks, modifying the schedule or coordinating with other radiology operations. It is also beneficially provided that underutilization of resources is identified. The system's optimization algorithm in one example consumes the capacity utilization and economic opportunity cost transfer functions in its exploration for the most robust system set points and policy heuristics. The mathematical programming is well appreciated by those familiar with the art of Operations Research. The disclosed multi-resource scheduling system hosts the algorithm.

The problem of finding and ordering the available time slots can be formulated as a constraint satisfaction problem. Constraint programming is a programming paradigm where relations between variables are stated in the form of constraints. The availability of various resources for a radiology exam to be scheduled can be described using mathematical and logical constraints. Constraint program solvers can solve this constraint satisfaction problem to generate a list of all possible slots available for the exam. These slots can then be sorted based on their desirability and presented to the user who is scheduling the exam. A heuristic algorithm for solving this problem is disclosed as an alternate to the constraint-programming method. The heuristic algorithm, depicted in FIG. 7, at 705, begins by determining all possible time slots available on the main radiology equipment (CT, MR etc.) needed for the patient exam within a desirable time window specified by the user. The set, S, of these time slots available on the radiology equipment are then pruned in a systematic manner based on the availability of the other resources needed for conducting the exam. For each slot in the set S (710), a determination is made regarding whether all of the resources (715) needed for the exam are available at the right time for performing the exam (720, 725). If any of the resources required is not available, at 735, the exam slot under consideration is deleted from the set, S. In this manner, at 730, each slot in the set is examined, and those that are not feasible due to the unavailability of at least one of the resources are deleted. At 740, the resulting set of undeleted slots are then sorted based on their desirability to the patient and/or the clinic.

Thus, certain examples search to find all time slots where all required resources are available. Time slots are presented in increasing order of desirability. The best resource is selected based on a number of user specified criteria. Exam completion risk is evaluated by imposing desired schedule duration, for example.

In certain examples, a user can manually schedule emergency exam with correct resources. The scheduler can depict a new emergency exam added to a schedule and its impact on other activity and resources. Certain examples optimize or improve the current resources based on the addition of the emergency exam. The scheduler can alert a front desk (e.g., a patient tracking resource) to update patients about delays or reschedule patients as appropriate, for example.

Figure 8:
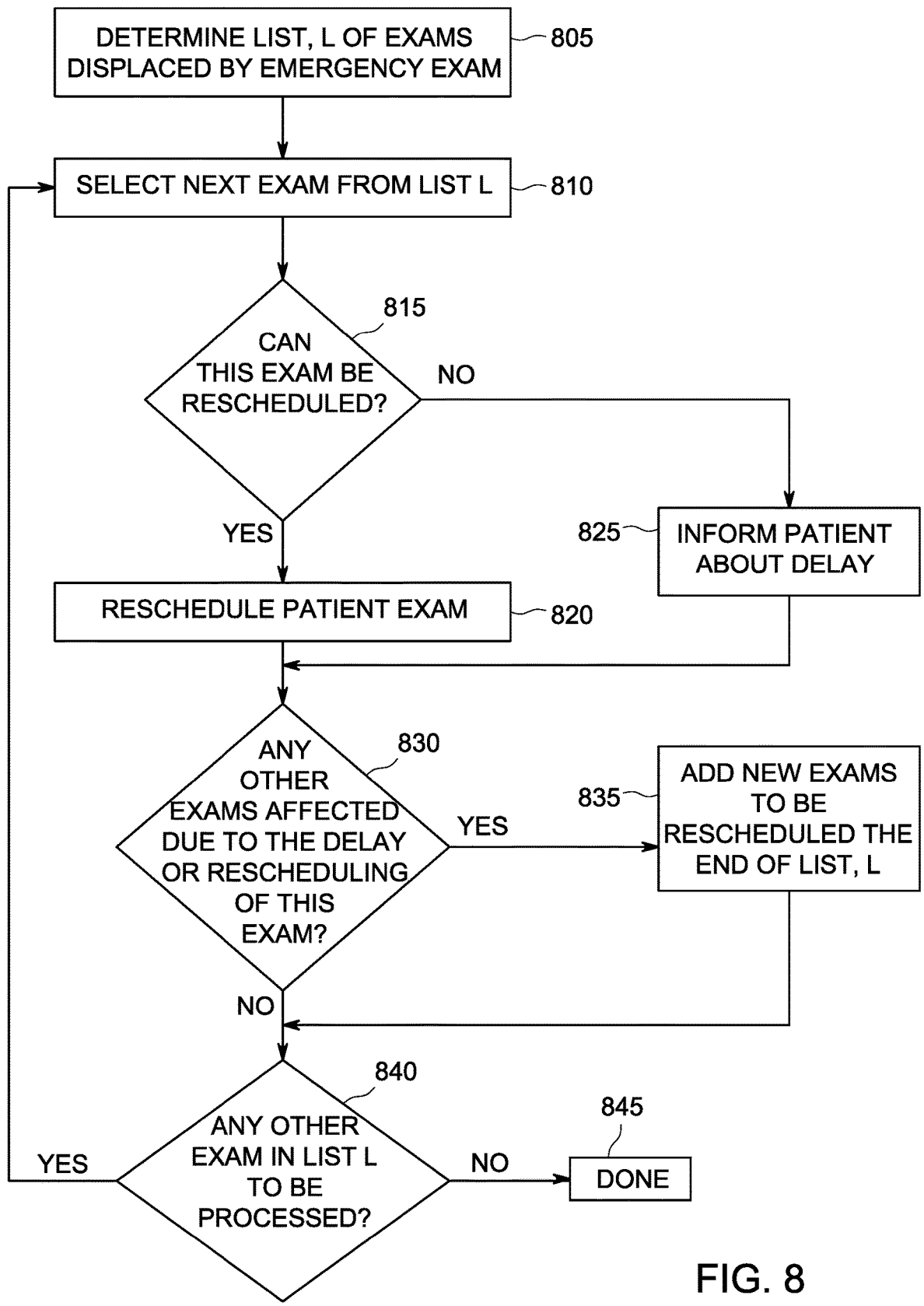
FIG. 8 describes an example methodology for rescheduling exams to accommodate an emergency exam.

Emergency situations where a patient exam needs to be scheduled at a specified time regardless of availability of resources occur frequently especially in radiology clinics in hospitals. Such exams are conducted by preempting or delaying already scheduled exams. The exams that are displaced by the emergency exam need to be rescheduled. In FIG. 8, a new methodology for rescheduling such exams is described. The methodology begins by generating a list of scheduled exams that are displaced by the emergency exams (805). The list is sorted in chronological order of the exam start time. This list is processed one exam at a time starting at the top of the list (810). For each exam in the list, it is examined, at 815, to determine if it can be rescheduled (820, 825). Exams to be performed on inpatients can in general be rescheduled in a large fraction of the cases. Scheduled exams where the outpatient is not at or in transit to the clinic can also be rescheduled in a majority of the cases. Exam cases where the outpatient is already at the clinic or the inpatient exam needs to be completed by a certain time cannot be rescheduled. Such exams are delayed and appropriate personnel and the patient are informed. When an exam is rescheduled or delayed it can affect a number of other scheduled exams, which then need to be delayed or rescheduled (830). At 835, any such exams are added to the list L. At 840, the process is repeated until all exams in the list are rescheduled (845).

Figure 7:
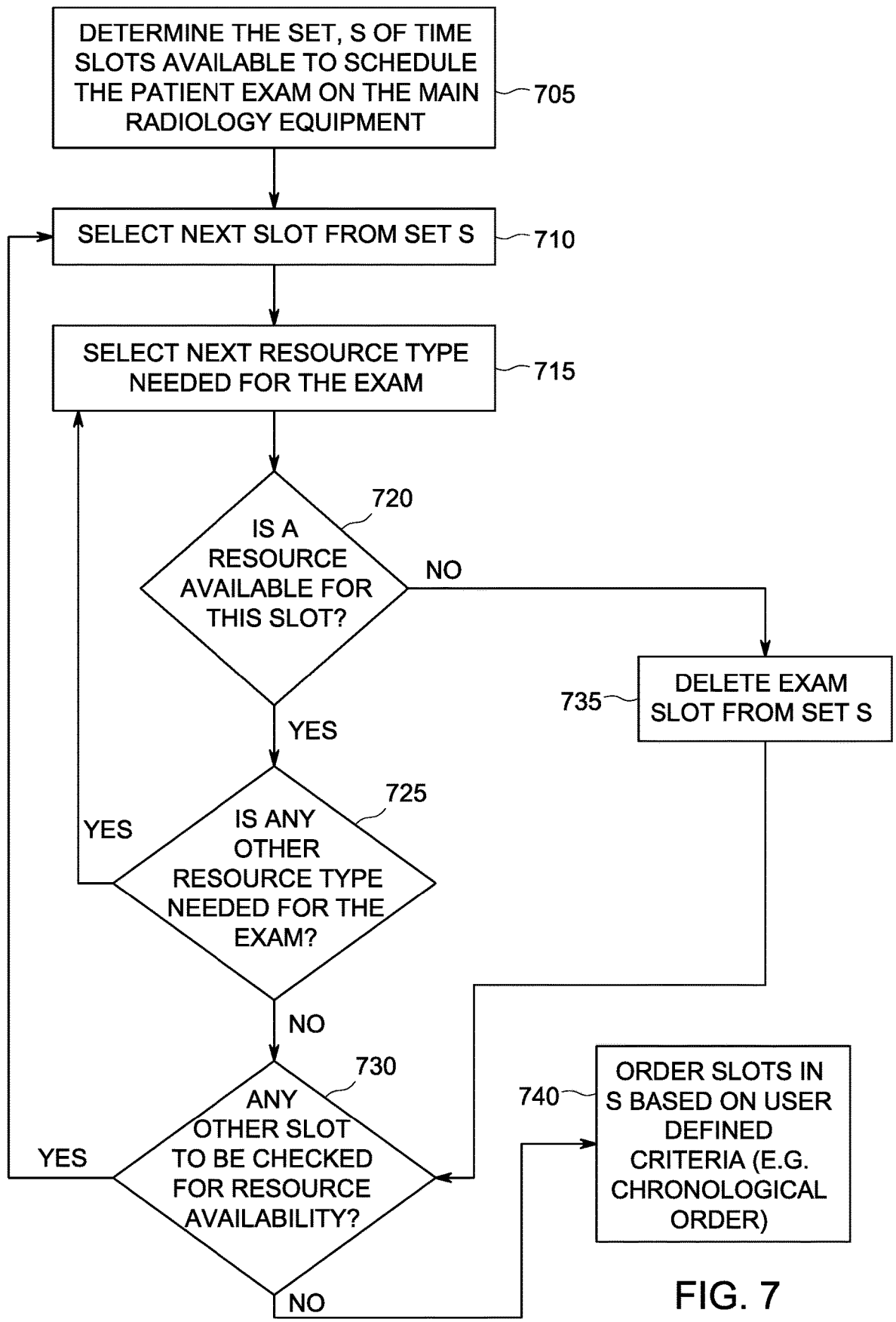
FIG. 7 depicts an example heuristic algorithm for sorting time slots based on desirability and presenting results to a user who is scheduling an exam.

FIGS. 7 and 8 depict example flow diagrams representative of processes that may be implemented using, for example, computer readable instructions that may be used to facilitate multi-resource scheduling, review, and rescheduling. The example processes of FIGS. 7 and 8 may be performed using a processor, a controller and/or any other suitable processing device. For example, the example processes of FIGS. 7 and 8 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 7 and 8 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 7 and 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 7 and 8 may be implemented manually or as any combination(s) of any of the foregoing techniques, for example, any combination of firmware, software, discrete logic and/or hardware. Further, although the example processes of FIGS. 7 and 8 are described with reference to the flow diagram of FIGS. 7 and 8, other methods of implementing the processes of FIGS. 7 and 8 may be employed. For example, the order of execution of the blocks may be changed, and/or some of the blocks described may be changed, eliminated, sub-divided, or combined. Additionally, any or all of the example processes of FIGS. 7 and 8 may be performed sequentially and/or in parallel by, for example, separate processing threads, processors, devices, discrete logic, circuits, etc.

Figure 9:
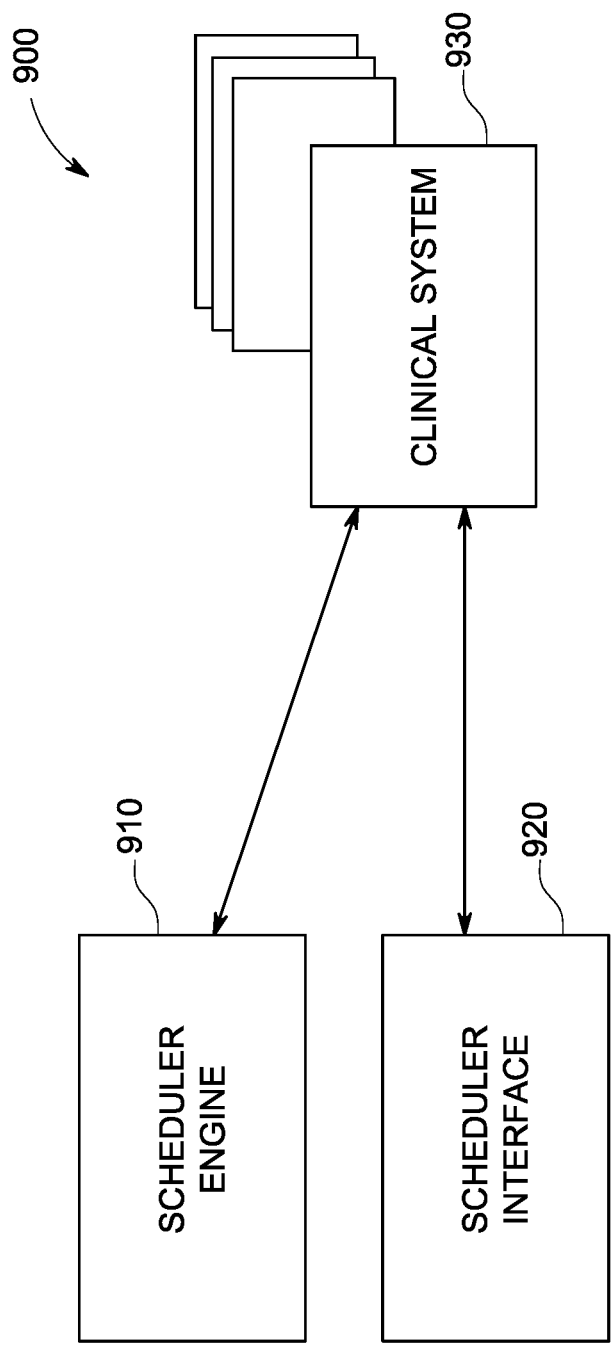
FIG. 9 is a block diagram illustration of an example multi-resource scheduling system for use in planning clinical procedures in a clinical enterprise.

FIG. 9 is a block diagram illustration of an example multi-resource scheduling system 900 for use in planning clinical procedures in a clinical enterprise. The system 900 includes a scheduler engine 910, a scheduler interface 920, and a clinical system 930. The scheduler engine 910 generates a schedule of tasks, as described above in association with FIGS. 1-8, based on task information, sub-task information, and resource information. Such information can be obtained from the clinical system 930, such as RIS, calendar/practice management system, electronic medical record (EMR) system, picture archiving and communication system (PACS), imaging system, and the like. Schedule information, such as a completed schedule and/or options for task scheduling/rescheduling can be presented to a user via the scheduler interface 920, as described above in association with FIGS. 1-8. Information regarding a schedule and its constituent tasks, sub-tasks, and resources utilized (e.g., staff, equipment, room, etc.) can be provided to the clinical system 930 as well.

Figure 10:
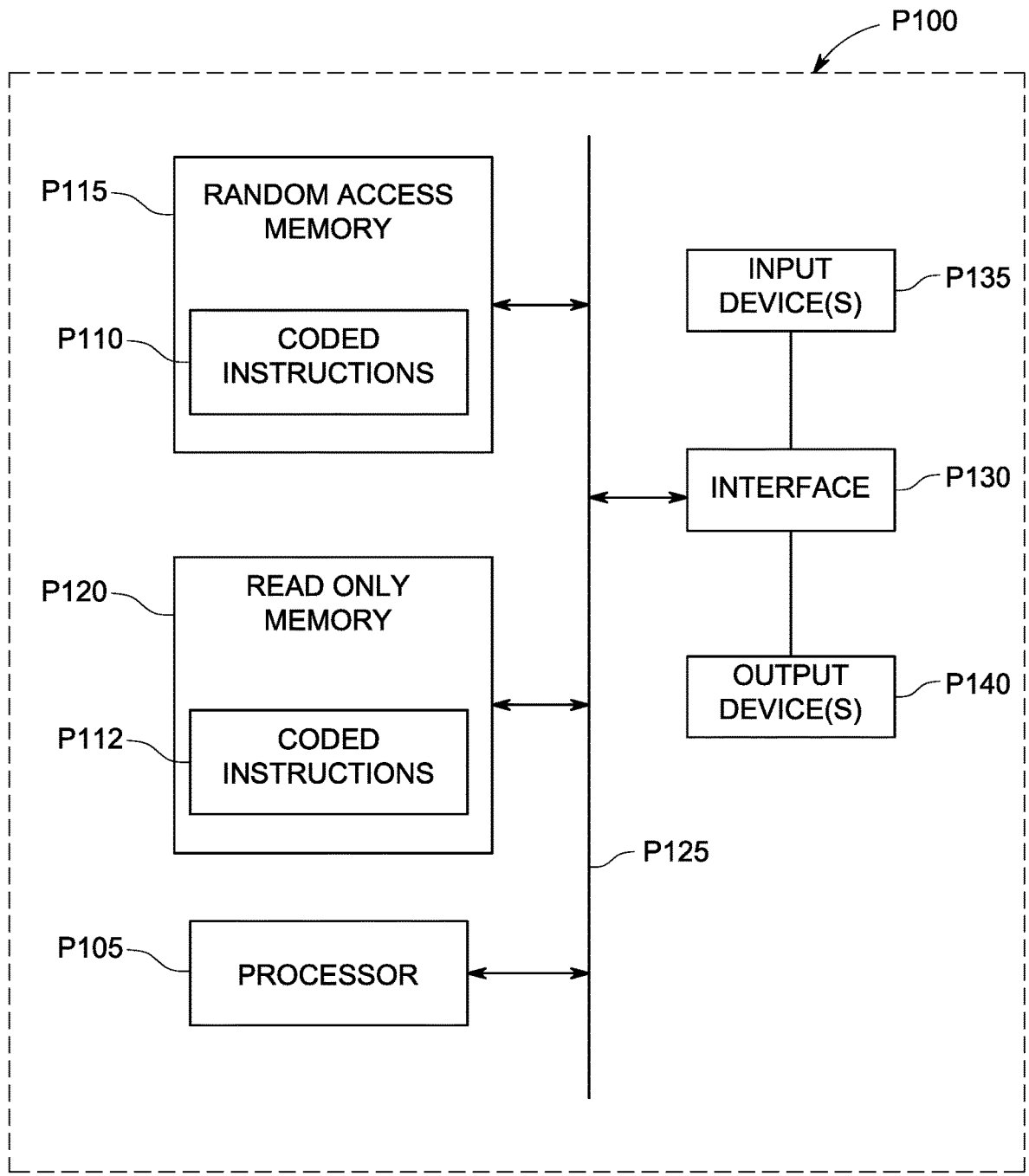
FIG. 10 is a schematic diagram of an example processor platform that may be used and/or programmed to implement the example systems and methods described herein.

FIG. 10 is a schematic diagram of an example processor platform P100 that can be used and/or programmed to implement the example systems and methods described above. For example, the processor platform P100 can be implemented by one or more general-purpose processors, processor cores, microcontrollers, etc.

The processor platform P100 of the example of FIG. 10 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIGS. 7-8 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example databases described herein.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 may be used to, for example, receive patient documents from a remote server and/or database. The example output devices P140 may be used to, for example, provide patient documents for review and/or storage at a remote server and/or database.

Thus, certain examples provide schedule adaptivity, prediction, and display. Certain examples incorporate clinical department economics and the economics of adding a case or appointment, for example. Certain examples interact with hospital, clinic, and/or healthcare facility on both in patient and out patient levels, which often occur at different times of day. Certain examples provide multi-clinic resource planning, mass balance, etc. Certain examples use an IBM iLog Gantt scheduling infrastructure for scheduling flexibility and prediction. Certain examples allow a user to determine whether a new case can be fit into a schedule and how much must be moved/adjusted to fit in the case. Additionally, certain examples help a user evaluate the financial impact of fitting in a case at a location. Certain examples help a user evaluate availability at a first location and availability at a second location to help determine whether and where a case should be routed and inserted into a schedule. Certain examples provide load balancing and dynamic schedule adjustment during a day.

Certain examples provide an economic value calculation for underutilized and/or oversubscribed assets. Certain examples provide routing decision support based upon a multi-resource schedule. Certain example use forecast and forecast confidence interval at a time of booking in a radiology information system and/or throughput limitation attribution analysis for radiological departments, multi-clinic resource planning, etc.

Certain examples can also provide prioritization of cases by descriptive attributes of presenting condition. "Stat" indicators on add-in scheduling requests can also be prioritized. Certain examples provide an ability for staff to provide feedback on actual "stat" request vs. actual presenting attributes and the creation of a credibility score. In certain examples, cases can be prioritized by descriptive attributes of ability to pay. An authorization likelihood can be calculated based upon progression of the workflow as a function of time and provided information, for example. Cases can be prioritized based upon fidelity of requisite preauthorization requirements met, for example.

In certain examples, global department objective function can be determined along the one or several dimensions of throughput, inventory, operating expense, ability to serve, financial risk and return, staff preferences, staff "burnout", etc. Routing decision support can be provided based upon a multi-resource schedule. In certain examples, RFID information can be used in supplying information to asset utilization assumptions—historical durations, current location, anticipated transport time, etc. In certain examples, use of computer vision can supply clinical workflow status and assumptions. Historical durations can be used to inform a scheduler at a time of case booking, for example. In some examples, scheduling input can be provided to hospital location tracking and bed board system. When faced with an infeasible throughput, certain examples can provide decision support on patients to move, cancel, change or suggest to change procedures, etc.

Certain examples provide spatial-temporal visualization of scheduled clinical workflow. Certain examples provide spatial-temporal visualization of actual clinical workflow. Certain examples enable visualization of actual versus scheduled workflow.

Certain examples provide an ability to consume an ordered workflow or protocol, such as from a medical society, standard operating procedure, or a doctor preference, and translate into schedule requirements. Certain examples allow simultaneous scheduling of multiple radiology equipment and staff resources. Certain examples allow staff resource scheduling for specific durations during procedures. Certain examples monitor equipment and staff resources and can dynamically change equipment and staff resources in real time (or substantially real time). Certain examples project resource utilization for future equipment and/or resource additions.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain example embodiments of the present invention can omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may include RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions include, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Examples can be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples can also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of example embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed.

The invention claimed is:

1. A multi-resource scheduling apparatus comprising:
a processor to implement a scheduler engine in conjunction with one or more clinical systems, wherein the scheduler engine comprises at least programming instructions which, in response to execution by the processor, cause the processor to:
enable the one or more clinical systems to operate with the scheduler engine in an analytical mode and an operating mode, wherein, when in the analytical mode:
the scheduler engine dynamically calculates one or more binding constraints on the one or more clinical systems for scheduling, wherein the calculation of the one or more binding constraints is based on one or more event inputs received from the one or more clinical systems, the event inputs comprising at least a sequence of one or more tasks and sub-tasks, and associated resource locations for the one or more tasks and sub-tasks;
when in the operating mode:
the scheduler engine configures and transmits a schedule to one or more scheduler interfaces of the one or more clinical systems, wherein the schedule is based on the one or more binding constraints calculated in the analytical mode, and wherein the scheduler engine monitors, via a computer network, execution of the schedule by the one or more clinical systems, wherein the monitoring comprises tracking the resource locations during execution of the sequence of the one or more tasks and sub-tasks;
wherein the scheduler engine dynamically switches between the analytical mode and the operating mode based at least in part on a probabilistic determination of delay associated with the schedule, wherein the probabilistic determination of delay is associated with a schedule risk and the scheduler engine continually calculates the probabilistic determination of delay based on the monitoring, the scheduler engine triggered to switch from the operating mode to the analytical mode when the scheduler engine determines, based on the probabilistic determination of delay and the associated schedule risk, that at least one of the one or more binding constraints is not satisfied and to switch from the analytical mode to the operating mode when the scheduler engine has recalculated the one or more binding constraints, and
wherein the scheduler engine transmits a reconfigured schedule to the one or more clinical systems to provide load balancing and dynamic schedule adjustment to the one or more clinical systems.

2. The apparatus of claim 1, wherein the schedule risk is associated with a probability density function of time for a duration estimation of the one or more tasks in the schedule.

3. The apparatus of claim 2, wherein the schedule risk is to be determined based on a simulation of task durations and logic for interdependencies between resources.

4. The apparatus of claim 2, wherein the schedule risk is to be determined based on measures of duration, availability, and reliability for the schedule.

5. The apparatus of claim 1, wherein the scheduler engine is to dynamically switch between the analytical mode and the operating mode based at least in part on a change in location of resources for adjacent tasks such that an estimation of transport time relative to task duration decreases a probability of task completion below an adjustable level.

6. The apparatus of claim 1, wherein, when in the analytical mode, the scheduler engine is to calculate slack values for relaxing the binding constraints.

7. The apparatus of claim 1, wherein, when in the analytical mode, the scheduler engine is to perform at least one of a what-was, what-is, what-if, or forecast analysis with respect to the one or more clinical systems for throughput and resource utilization.

8. The apparatus of claim 1, wherein the scheduler engine is to determine the schedule based on at least one of a constraint satisfaction problem or heuristics to determine resource availability for the schedule.

9. A non-transitory computer-readable storage medium comprising a set of instructions, which, in response to execution by a processor, cause the processor to implement a scheduler engine operating in conjunction with one or more clinical systems, the scheduler engine configured to:
enable the one or more clinical systems to operate with the scheduler engine in an analytical mode and an operating mode, wherein, when in the analytical mode;
the scheduler engine dynamically calculates one or more binding constraints on the one or more clinical systems for scheduling, wherein the calculation of the one or more binding constraints is based on one or more event inputs received from the one or more clinical systems, the event inputs comprising one or more tasks and sub-tasks, and associated resource locations for the one or more tasks and sub-tasks; and
when in the operating mode:
the scheduler engine configures and transmits a schedule to one or more scheduler interfaces of the one or more clinical systems, wherein the schedule is based on the one or more binding constraints calculated in the analytical mode, and wherein the schedule engine monitors, via a computer network, execution of the schedule by the one or more clinical systems, wherein the monitoring comprises tracking the resource locations during execution of the one or more tasks and sub-tasks;
wherein the scheduler engine dynamically switches between the analytical mode and the operating mode based at least in part on a probabilistic determination of delay associated with the schedule and the scheduler engine continually calculates the probabilistic determination of delay based on the monitoring, the scheduler engine triggered to switch from the operating mode to the analytical mode when the scheduler engine determines, based on the probabilistic determination of delay, that at least one of the one or more binding constraints is not satisfied and to switch from the analytical mode to the operating mode when the scheduler engine has recalculated the one or more binding constraints; and
wherein the scheduler engine transmits a reconfigured schedule to the one or more clinical systems to provide load balancing and dynamic schedule adjustment to the one or more clinical systems.

10. The computer-readable storage medium of claim 9, wherein the probabilistic determination of delay associated with the schedule includes a schedule risk associated with a probability density function of time for a duration estimation of a task in the schedule.

11. The computer-readable storage medium of claim 10, wherein the schedule risk is to be determined based on a simulation of task durations and logic for interdependencies between resources.

12. The computer-readable storage medium of claim 10, wherein the schedule risk is to be determined based on measures of duration, availability, and reliability for the schedule.

13. The computer-readable storage medium of claim 9, wherein the scheduler engine is to dynamically switch between the analytical mode and the operating mode based at least in part on a change in location of resources for adjacent tasks such that an estimation of transport time relative to task duration decreases a probability of task completion below an adjustable level.

14. The computer-readable storage medium of claim 9, wherein, when in the analytical mode, the scheduler engine is to calculate slack values for relaxing the binding constraints.

15. The computer-readable storage medium of claim 9, wherein, when in the analytical mode, the scheduler engine is to perform at least one of a what-was, what-is, what-if, or forecast analysis with respect to the one or more clinical systems for throughput and resource utilization.

16. The computer-readable storage medium of claim 9, wherein the scheduler engine is to determine the schedule based on at least one of a constraint satisfaction problem or heuristics to determine resource availability for the schedule.

17. A computer-implemented method for multi-resource scheduling, the method comprising:
configuring, by a scheduler engine including a processor, the scheduler engine to operate with one or more clinical systems in an analytical mode and an operating mode;
when in the analytical mode, dynamically calculating, by the scheduler engine, one or more binding constraints on the one or more clinical systems for scheduling, wherein the calculation of the one or more binding constraints is based on one or more event inputs received from the one or more clinical systems, the event inputs comprising at least one or more tasks and sub-tasks, and associated resource locations for the one or more tasks and sub-tasks;
when in the operating mode, configuring and transmitting a schedule, by the scheduler engine to one or more scheduler interfaces of the one or more clinical systems, wherein the schedule is based on the one or more binding constraints calculated in the analytical mode, and monitoring, via a computer network, execution of the schedule by the one or more clinical systems, wherein the monitoring comprises tracking the resource locations during execution of the one or more tasks and sub-tasks, the schedule to be output to the one or more clinical systems to provide load balancing and dynamic schedule adjustment to the one or more clinical systems; and
dynamically switching, by the scheduler engine, between the analytical mode and the operating mode based at least in part on a probabilistic determination of delay associated with the schedule, wherein the probabilistic determination of delay is associated with a schedule risk and the scheduler engine calculates the probabilistic determination of delay based on the monitoring, the scheduler engine triggered to switch from the operating mode to the analytical mode when the scheduler engine determines, based on the probabilistic determination of delay and the associated schedule risk, that at least one of the one or more binding constraints is not satisfied and to switch from the analytical mode to the operating mode when the scheduler engine has recalculated the one or more binding constraints; and transmitting a reconfigured schedule to the one or more clinical systems to provide load balancing and dynamic schedule adjustment to the one or more clinical systems.

18. The method of claim 17, wherein the schedule risk is associated with a probability density function of time for a duration estimation of the one or more tasks in the schedule.

19. The method of claim 17, wherein the scheduler engine is to dynamically switch between the analytical mode and the operating mode based at least in part on a change in location of resources for adjacent tasks such that an estimation of transport time relative to task duration decreases a probability of task completion below an adjustable level.

20. The method of claim 17, wherein, when in the analytical mode, the scheduler engine is to calculate slack values for relaxing the binding constraints.

* * * * *